United States Patent
Mitani et al.

(10) Patent No.: US 11,743,593 B2
(45) Date of Patent: Aug. 29, 2023

(54) IMAGING DEVICE, IMAGING SIGNAL PROCESSING DEVICE, AND IMAGING SIGNAL PROCESSING METHOD TO REDUCE IMAGE DISPLAY DELAY

(71) Applicant: SONY GROUP CORPORATION, Tokyo (JP)

(72) Inventors: Hitoshi Mitani, Tokyo (JP); Masafumi Wakazono, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 45 days.

(21) Appl. No.: 17/441,428

(22) PCT Filed: Dec. 10, 2019

(86) PCT No.: PCT/JP2019/048326
§ 371 (c)(1),
(2) Date: Sep. 21, 2021

(87) PCT Pub. No.: WO2020/202648
PCT Pub. Date: Oct. 8, 2020

(65) Prior Publication Data
US 2022/0182528 A1 Jun. 9, 2022

(30) Foreign Application Priority Data

Mar. 29, 2019 (JP) ................................ 2019-068488

(51) Int. Cl.
*H04N 23/73* (2023.01)
*H04N 23/667* (2023.01)
*H04N 23/741* (2023.01)

(52) U.S. Cl.
CPC ........... *H04N 23/73* (2023.01); *H04N 23/667* (2023.01); *H04N 23/741* (2023.01)

(58) Field of Classification Search
CPC .... H04N 23/73; H04N 23/667; H04N 23/741; H04N 23/632; H04N 23/6812;
(Continued)

(56) References Cited

U.S. PATENT DOCUMENTS 10,602,051 B2 * 3/2020 Furumochi ............ H04N 25/53
10,810,916 B2 * 10/2020 Hayashi ................. G09G 3/003
(Continued)

FOREIGN PATENT DOCUMENTS

JP 2011-004121 A 1/2011
JP 2013-110738 A 6/2013
(Continued)

OTHER PUBLICATIONS

International Search Report and Written Opinion of PCT Application No. PCT/JP2019/048326, dated Mar. 3, 2020, 08 pages of ISRWO.

*Primary Examiner* — Ahmed A Berhan
(74) *Attorney, Agent, or Firm* — Chip Law Group

(57) ABSTRACT

An image display delay due to a display delay time is reduced. Therefore, an imaging device according to the present technology includes: an imaging element; a delay time acquisition unit that acquires a display delay time of a captured image based on an exposure time of an imaging element and a development processing time required for development processing; and an image data generation unit configured to generate modified display image data in which an image display delay due to the display delay time has been reduced using an amount of change in a position or posture of an imaging device body during the display delay time. A delay in image display is reduced so that visually induced motion sickness is prevented.

19 Claims, 36 Drawing Sheets

(58) Field of Classification Search
CPC .. H04N 23/683; H04N 23/951; H04N 23/611; H04N 23/80; H04N 23/90; H04N 5/2353; H04N 5/232935; G03B 5/00; G03B 17/18
See application file for complete search history.

(56) References Cited

U.S. PATENT DOCUMENTS

2013/0107062 A1 5/2013 Okazaki
2016/0100145 A1 4/2016 Gunji et al.

FOREIGN PATENT DOCUMENTS

| JP | 2016-076771 A | 5/2016 |
| JP | 2017-034494 A | 2/2017 |

* cited by examiner

| VISUAL SYSTEM TIME T1 | COGNITIVE TIME T2 |

FIG. 3B

| CONDENSING TIME T3 (≈0) | VISUAL SYSTEM TIME T1 | COGNITIVE TIME T2 |

FIG. 3C

| EXPOSURE TIME T4 | READOUT TIME T5 | DEVELOPMENT TIME T6 | DISPLAY TIME T7 | VISUAL SYSTEM TIME T1 | COGNITIVE TIME T2 |

…

IMAGING DEVICE, IMAGING SIGNAL PROCESSING DEVICE, AND IMAGING SIGNAL PROCESSING METHOD TO REDUCE IMAGE DISPLAY DELAY

CROSS REFERENCE TO RELATED APPLICATIONS

This application is a U.S. National Phase of International Patent Application No. PCT/JP2019/048326 filed on Dec. 10, 2019, which claims priority benefit of Japanese Patent Application No. JP 2019-068488 filed in the Japan Patent Office on Mar. 29, 2019. Each of the above-referenced applications is hereby incorporated herein by reference in its entirety.

TECHNICAL FIELD

The present technology relates to a technical field of an imaging device that generates image data for a display from acquired captured image data, an imaging signal processing device, and an imaging signal processing method. In particular, the present technology relates to an imaging device that performs processing according to a delay time from imaging to a display, an imaging signal processing device, and an imaging signal processing method.

BACKGROUND ART

When an image captured by an imaging device such as a camera or a video camera is displayed, visually-induced motion sickness (video sickness) may be caused in a viewer due to shaking of an image in a moving image. Further, in a still image, there is concern that the image may be blurred due to camera shake at the time of shooting, which may make it indistinct.

PTL 1 discloses a technology for preventing a motion of a camera from being reflected in a display frame image by changing a cropping area when display frame image data is generated by cropping a part of frame image data.

CITATION LIST

Patent Literature

[PTL 1]
JP 2017-34494 A

SUMMARY

Technical Problem

Incidentally, necessary time is required for exposure of subject light (light reflected from a subject), development processing (various imaging signal processing), or the like for display and recording of captured image data captured by a camera or a video camera. That is, the captured image data is not immediately displayed (recorded), but is displayed (recorded) after a display delay time. The display delay time may cause visually induced motion sickness in a viewer.

For example, when an imaging device and a head of a photographer shake to the left and right in a state in which the photographer is looking into an electronic viewfinder (EVF) provided in the imaging device, a deviation based on the display delay time occurs between visual information of a display image displayed on a monitor inside the EVF and a sense of balance due to head being shaken, which may cause visually induced motion sickness.

Therefore, an object of the present technology is to reduce an image display delay due to a display delay time.

Solution to Problem

An imaging device according to the present technology includes: an imaging element; a delay time acquisition unit configured to acquire a display delay time of a captured image based on an exposure time of an imaging element and a development processing time required for development processing; and an image data generation unit configured to generate modified display image data in which an image display delay due to the display delay time has been reduced using an amount of change in a position or posture of an imaging device body during the display delay time.

The modified display image data in which the image display delay has been reduced is display image data obtained by performing translation, enlargement and reduction, or rotation movement in an up and down direction and a left and right direction, for example, when conversion from captured image data captured by the imaging element into display image data for a display on a display unit is performed so that an amount of movement of the image during a delay time is offset. Hereinafter, this translation, enlargement and reduction, and rotation are collectively referred to as a shift.

The above-described imaging device may include a display unit on which the modified display image data is displayed.

The display unit is, for example, an electronic viewfinder (EVF) monitor provided in an EVF or a rear monitor attached to a back of the imaging device.

The display unit in the imaging device described above may be provided inside the electronic viewfinder.

An enclosure that covers the display unit (EVF monitor) in the electronic viewfinder may be provided around the electronic viewfinder.

The image data generation unit in the imaging device described above may perform modification processing for generating the modified display image data is not so that a display position of a subject on the display unit is shifted as compared with a case in which the modification processing performed.

It is possible to perform a display following the motion of the imaging device by generating the modified display image data to be shifted with respect to a position on the captured image data.

The image data generation unit in the imaging device described above may generate non-modified display image data in which the image display delay due to the display delay time is not reduced, and display image data transmitted to a display unit outside the imaging device may be the non-modified display image data.

The display unit external to the imaging device is, for example, a stationary television receiver, a liquid crystal display device, or a portable smartphone.

The image data generation unit in the imaging device described above may generate non-modified display image data in which the image display delay due to the display delay time is not reduced and may include a display image data selection unit configured to select either the modified display image data or the non-modified display image data as display image data to be displayed on a display unit according to a shooting state.

The shooting state is a state based on, for example, a still image capturing mode or a moving image capturing mode (that is, a type of shooting mode). Alternatively, the shooting state may be an amount of movement, acceleration, or angular velocity of the imaging device in an up and down direction and a left and right direction. Further, the shooting state may be an output destination of the display image data.

The display image data selection unit in the imaging device described above may select the non-modified display image data when a mode for shooting a moving image is selected as the shooting state.

In the moving image capturing mode, it is conceivable for a photographer to curb an amount of movement or acceleration change per unit time of the imaging device in an up and down direction and a left and right direction in order to capture a moving image that is easy to see.

The display image data selection unit in the imaging device described above may select the modified display image data when a mode for capturing a still image is selected as the shooting state.

It is conceivable that, in the still image capturing mode, the photographer determine an angle of view so that a subject desired to be shot fits into a composition desired for shooting, and move the imaging device so that the subject fits into the angle of view. Further, in such a case, it is conceivable to move the imaging device rapidly not to miss a best shooting timing considered by the photographer.

The image data generation unit in the imaging device described above may perform generation of the modified display image data on the basis of information on an incidence optical system for the imaging element.

The information on the incidence optical system for the imaging element is, for example, information on a type of lens such as a telephoto lens or a wide-angle lens, or a setting value of an aperture.

The image data generation unit in the imaging device described above may use pixel data having a specific brightness for an area of the modified display image data not imaged by the imaging element.

Respective pixels of the display image displayed on the basis of the modified display image data may include pixels in which the captured image data in the cropping range of the imaging element is displayed, pixels in which the captured image data outside the cropping range of the imaging element is displayed, and pixels outside the range of the imaging element, that is, pixels in which an image in a range not captured by the imaging element is to be displayed.

The image data generation unit in the imaging device described above may use captured image data outside a cropping range for the modified display image data. The captured image data in the cropping range refers to an area cropped as a range of lens distortion pixels or pixels effective in processing such as image stabilization in the entire pixel area exposed to the subject light by the imaging element. That is, the captured image data outside the cropping range refers to an area other than the area cropped as the range of lens distortion pixels or pixels effective in processing such as image stabilization.

The imaging device described above may include a second imaging element configured to generate second captured image data based on incident light incident through a second incidence optical system, wherein the image data generation unit may use the second captured image data for an area of the modified display image data not imaged by the imaging element.

For example, the imaging device may include a sub-imaging device including the second incidence optical system and the second imaging element.

The image data generation unit in the imaging device described above may use captured image data in a cropping range for an area of the modified display image data not imaged by the imaging element.

That is, the modified display image data is generated using the captured image data in the cropping range.

The image data generation unit in the imaging device described above may determine a superimposition position according to an amount of shift of the subject with respect to at least a part of a superimposition display image to be superimposed and displayed on captured image data.

The amount of shift of the subject is a difference (including translation, enlargement and reduction, and rotation movement) between a position on the display area in which the subject is displayed when the image display delay due to the display delay time is not considered and a position on the display area in which the subject is displayed when the image display delay due to the display delay time is considered.

Further, the superimposed display image is an icon image for indicating a shooting mode, a display icon indicating a remaining number of shots, an image icon indicating a battery charge amount, an icon indicating a position of a focus aiming, an image icon indicating a position of a face of a recognized person, and the like. Alternatively, a histogram indicating a brightness distribution, for example, may also be included in the superimposed display image.

The image data generation unit in the imaging device described above may determine a superimposition position according to an amount of shift with respect to a focus aiming imaging serving as a superimposed display image.

For example, the focus aiming is a superimposed display image indicating a specific position on the image.

In the imaging device described above, an area in which the captured image is displayed on the display area of the display unit may be smaller than the display area.

For example, a display image according to the captured image data is displayed in a part (for example, a part around an area of a central part) of the entire display area of the display unit.

The image data generation unit in the imaging device described above may perform generation of display image data on which a guide frame indicating an output area has been superimposed.

The guide frame indicating the output area is, for example, a guide frame indicating a recorded area.

An imaging signal processing device of the present technology includes a delay time acquisition unit configured to acquire a display delay time of a captured image based on an exposure time of an imaging element included in an imaging device and a development processing time required for development processing; and an image data generation unit configured to generate modified display image data in which an image display delay due to the display delay time has been reduced using an amount of change in a position or posture of the imaging device during the display delay time.

An imaging signal processing method of the present technology includes acquiring a display delay time of a captured image based on an exposure time of an imaging element included in an imaging device and a development processing time required for development processing; and generating modified display image data in which an image display delay due to the display delay time has been reduced using an amount of change in a position or posture of the imaging device during the display delay time.

BRIEF DESCRIPTION OF DRAWINGS

FIGS. 3A, 3B, and 3C is a are diagrams illustrating a display delay time.

DESCRIPTION OF EMBODIMENTS

Hereinafter, embodiments will be described in the following order with reference to the accompanying drawings.
<1. Configuration of imaging device>
<2. Display delay time>
<3. Generation of modified display image data>
<3-1. Calculation of modification amount>
<3-2. First example of modified display image data>
<3-3. Second example of modified display image data>
<3-4. Third example of modified display image data>
<3-5. Fourth example of modified display image data>
<3-6. Fifth example of modified display image data>
<3-7. Sixth example of modified display image data>
<3-8. Seventh example of modified display image data>
<4. Flowchart>
<5. Display position of superimposed display image>
<6. Selection of modified display image data and non-modified display image data>
<7. Modification examples>
<8. Conclusion>
<9. Application example 1>
<10. Application example 2>
<11. The present technology>

1. Configuration of Imaging Device

Figure 1:
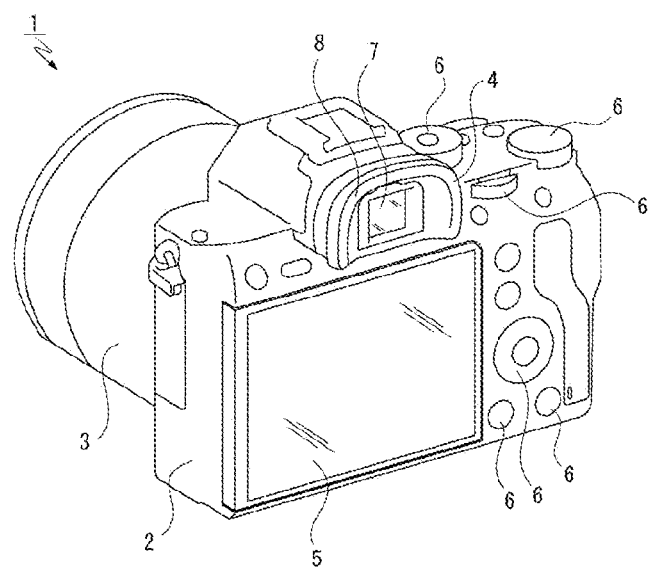
FIG. 1 is a perspective view of an imaging device according to an embodiment of the present technology.

FIG. 1 illustrates an appearance of an imaging device 1 according to the present embodiment.

The imaging device 1 includes a camera housing 2 including an internal space in which a substrate or the like is disposed, and a lens housing 3 attached to the front of the camera housing 2 and having a lens group disposed inside.

In the camera housing 2, an electronic viewfinder (EVF) 4 is provided at the top and a rear monitor 5 is attached to the rear side. In the camera housing 2, various operators 6 for imaging a subject and for confirming a captured image are provided in respective units. Specifically, the operators are, for example, a playback menu start button, a determination button, a cross key, a cancel button, a zoom key, a slide key, and a shutter button (release button).

The EVF 4 includes an EVF monitor 7 that can be visually recognized from the rear, and a frame-shaped enclosure 8 that protrudes rearward to surround the upper side and the left and right sides of the EVF monitor 7. That is, the EVF monitor 7 is provided inside the finder.

The rear monitor 5 can be rotated with respect to the camera housing 2. For example, the rear monitor 5 can be rotated so that a lower end portion of the rear monitor 5 moves rearward with an upper end portion of the rear monitor 5 used as a rotation axis.

A right end portion or left end portion of the rear monitor 5 may be used as the rotation axis. Further, the rear monitor 5 may be rotatable in a plurality of directions.

Figure 2:
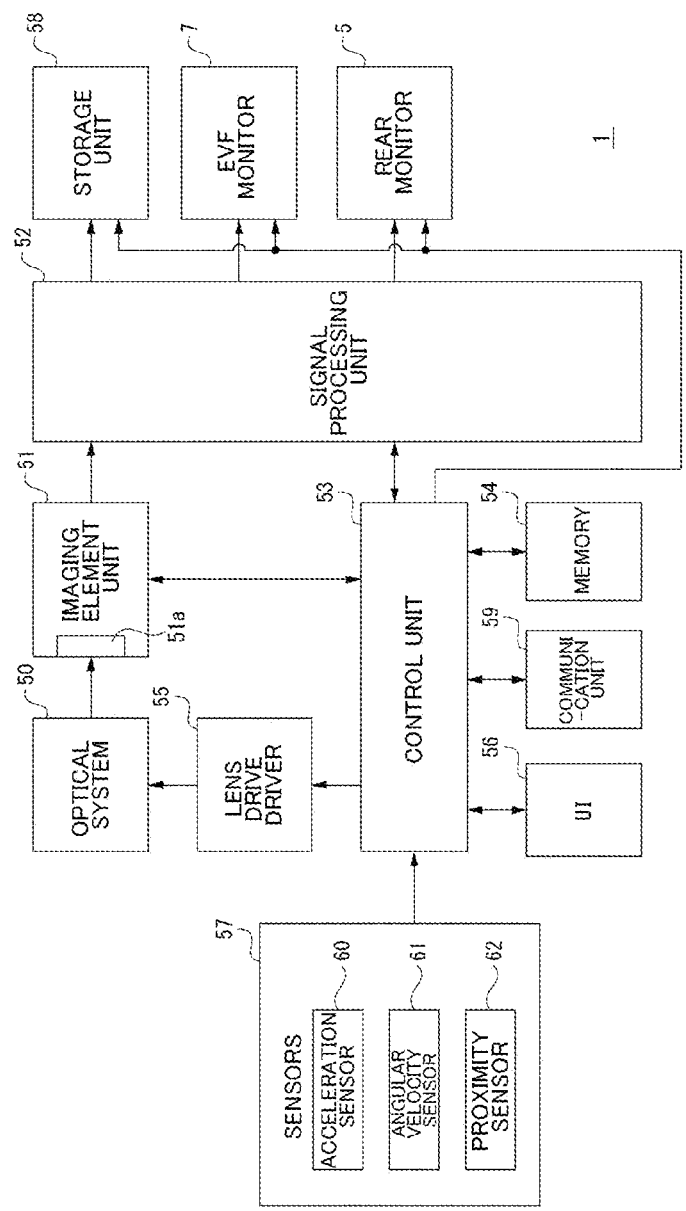
FIG. 2 is a block diagram of the imaging device.

FIG. 2 is a block diagram of the imaging device 1. The imaging device 1 includes an optical system 50, an imaging element unit 51, a signal processing unit 52, a control unit 53, a memory 54, a lens drive driver 55, a user interface (UI) 56, sensors 57, a storage unit 58, a communication unit 59, and the like.

The optical system 50 includes various lenses such as an incidence end lens, a zoom lens, a focus lens, and a condenser lens, and an aperture mechanism. The aperture mechanism performs exposure control by adjusting, for example, an aperture amount of a lens or an iris (aperture) so that sensing is performed in a state in which signal charge is not saturated and is in a dynamic range.

The imaging element unit 51 includes, for example, a charge coupled device (CCD) type or a complementary metal-oxide semiconductor (CMOS) type imaging element 51*a*.

A sensor surface of the imaging element 51*a* includes a sensing element in which a plurality of pixels are two-dimensionally arranged.

The imaging element unit 51 executes, for example, correlated double sampling (CDS) processing, automatic gain control (AGC) processing, and the like for the electrical signal obtained by photoelectric conversion of the light received by the imaging element 51*a*, and further performs analog/digital (A/D) conversion processing. The captured image data as digital data is output to the signal processing unit 52 in the subsequent stage.

The signal processing unit 52 is configured of, for example, a microprocessor specialized in digital signal processing such as a digital signal processor (DSP), or a microcomputer.

The signal processing unit 52 performs various signal processing on a digital signal (captured image signal) sent from the imaging element unit 51.

For example, preprocessing, synchronization processing, YC processing, resolution conversion processing, various codec processing, or the like is performed.

Various codec processing is coding processing for recording or communication of image data subjected to resolution conversion, for example.

In the preprocessing, clamping processing for clamping black levels of R, G, and B to a predetermined level, correction processing between color channels of R, G, and B, or the like is performed on the captured image data from the imaging element unit 51.

In the synchronization processing, color separation processing is performed so that image data for each pixel has all color components of R, G, and B. For example, in the case of the imaging element 51*a* in which color filters in a Bayer array have been used, demosaic processing is performed as the color separation processing.

In YC generation processing, a brightness (Y) signal and a color (C) signal are generated (separated) from the image data of R, G, and B.

In the resolution conversion processing, processing for converting resolution is performed on image data subjected to various signal processing.

The control unit 53 is configured of a microcomputer (arithmetic processing device) including a central processing unit (CPU) and the like. The control unit 53 includes a timer (not illustrated) capable of measuring a time.

The memory 54 stores information and the like used for processing of the control unit 53. The illustrated memory 54 comprehensively indicates various memories such as a random access memory (RAM), a read only memory (ROM), and a flash memory (nonvolatile memory).

The memory 54 may be a memory area built into a microcomputer chip serving as the control unit 53 or may be configured of a separate memory chip.

The RAM is used for temporary storage of data, programs or the like as a work area for various data processing of the CPU.

The ROM or the flash memory are used for storage of application programs for various operations, firmware, and the like, in addition to an operating system (OS) allowing the CPU to control each unit or content files such as image files.

The control unit 53 comprehensively controls the entire imaging device 1 by executing a program stored in the ROM, the flash memory, or the like.

For example, the control unit 53 controls the optical system 50 via the lens drive driver 55 to control a zoom operation, a focus operation, exposure adjustment, and the like. Further, the control unit 53 receives detection signals from the sensors 57 and realizes various operations.

Further, the control unit 53 receives instructions for control of a shutter speed of the imaging element unit 51 and various signal processing in the signal processing unit 52, and operation information according to an operation of the user via a user interface 56, and controls operations of respective necessary units for an imaging operation, a recording operation, a playback operation for a recorded image file, and the like.

The lens drive driver 55 is provided with, for example, a motor driver for a zoom lens drive motor, a motor driver for a focus lens drive motor, and a motor driver for a motor that drives an aperture mechanism.

The sensors 57 comprehensively indicate various sensors included in the imaging device 1. FIG. 2 illustrates some of the sensors 57 included in the imaging device 1. Examples of the sensors 57 include an acceleration sensor 60, an angular velocity sensor 61, and a proximity sensor 62.

The acceleration sensor 60 and the angular velocity sensor 61 detect a position change or a posture change of the camera housing 2, and transmit a detection signal as acceleration data and angular velocity data to the control unit 53. The control unit 53 can ascertain the posture or the posture change of the camera housing 2 on the basis of the detection signal. The acceleration sensor 60 and the angular velocity sensor 61 may be used not only for each processing to be described below but also for image stabilization.

The acceleration sensor 60 is provided for each of the X-axis, Y-axis, and Z-axis that are orthogonal to each other, for example. Further, the angular velocity sensor 61 is provided to be able to detect rotation of each of pitch, yaw, and roll, for example.

In the following description, an optical axis direction of the substantially cylindrical lens housing 3 (that is, an axial direction extending from the imaging device 1 to the subject) is a Z-axis, a left and right direction is a X-axis, and an up and down direction is a Y-axis.

The proximity sensor 62 is provided, for example, near the EVF monitor 7, detects that a face of the user is approaching the EVF monitor 7, and transmits a detection signal to the control unit 53. The control unit 53 performs, for example, an ON/OFF operation of various display devices on the basis of the detection signal.

The storage unit 58 is configured of, for example, a non-volatile memory, and functions as a storage area for storing image files (content files) such as still image data or moving image data, attribute information of the image files, thumbnail images, and the like.

The image files are stored in formats such as Joint Photographic Experts Group (JPEG), Tagged Image File Format (TIFF), and Graphics Interchange Format (GIF).

An actual form of the storage unit 58 can be considered in various ways. For example, the storage unit 58 may be configured as a flash memory built into the imaging device 1 or may be configured as a memory card (for example, a portable flash memory) that can be attached to and detached from the imaging device 1 and an access unit that performs access for storage or readout in or from the memory card. Further, the storage unit 58 may also be realized as a hard disk drive (HDD) or the like as a form built into the imaging device 1.

The communication unit 59 performs data communication or network communication with an external device by wire or wirelessly.

For example, the communication unit 59 performs transmission and reception of captured image data (still image files or moving image files) to and from an external display device, recording device, playback device, or the like. In the following description, image data captured by the imaging element 51a is referred to as captured image data regardless of whether or not image data is recorded.

Further, for example, communication may be performed by various networks such as the Internet, a home network, and a local area network (LAN) as a network communication unit, and transmission and reception of various pieces of data to and from a server, a terminal or the like on a network may be performed.

When the display image data output from the signal processing unit 52 is displayed on an external monitor of the imaging device 1 connected by a video cable or the like, the display image data is transmitted via the control unit 53 and the communication unit 59. The display image data may be transmitted from the signal processing unit 52 to the external monitor without passing through the control unit 53.

In the present embodiment, the control unit 53 calculates an amount of shift for reducing the image display delay due to the display delay time on the basis of the detection signals of the sensors 57, and transmits the amount of shift to the signal processing unit 52. The signal processing unit 52 generates modified display image data obtained by modifying the display image data using the amount of shift, and outputs the modified display image data to the display unit (the EVF monitor 7 or the rear monitor 5). This will be described in detail below.

2. Display Delay Time

In a case in which the subject is visually recognized via the display image displayed on the display unit such as the EVF monitor 7, it takes extra time to recognize the subject, unlike a case in which the subject is visually recognized by looking directly at the subject. This is caused by a time required for various types of processing.

This will be specifically described with reference to FIGS. 3A, 3B, and 3C.

FIG. 3A illustrates a time required for a person to recognize a subject when the subject is directly looked at. A time required for a human to recognize the subject when a human directly looks at the subject is a sum of a time for generating video information for the subject in a visual system of a human (a visual system time T1) and a time for the brain to recognize the video information (cognitive time T2).

FIG. 3B illustrates the time required to recognize the subject when the subject is visually recognized from an optical viewfinder (OVF) in an imaging device including the OVF. A time taken for a human to recognize the subject becomes longer according to a distance until the subject light (light reflected from the subject) enters the eyes, which extends due to physical reflection from each mirror (condensing time T3 illustrated in FIG. 3B). However, since the extended distance is at most several cm to tens of cm, and a time for light to pass over the distance is extremely close to zero, a time shown in FIG. 3A and a time shown in FIG. 3B are substantially the same.

Therefore, when the photographer has visually recognized the subject via the OVF, the photographer does not feel discomfort.

FIG. 3C illustrates the time required for the photographer to recognize the subject when the subject is visually recognized through the EVF monitor 7 provided in the EVF 4.

The subject light received by the imaging element 51a via the optical system 50 reaches the eyes of the photographer after an exposure time (exposure time T4) of the imaging element 51a, a time for reading out the electrical signal obtained by photoelectric conversion (readout time T5), a time (development time T6) for performing various signal processing on the captured image data (a digital signal), and a time (display time T7) for generating the display image data and displaying the display image data on the display unit. The photographer recognizes the subject displayed on the EVF monitor 7 after the above-described times T1 and T2 have passed.

That is, a time required for recognizing the subject via EVF 4 becomes longer than that of direct looking by the times T4, T5, T6 and T7.

This longer time will be hereinafter referred to as the "display delay time".

The display delay time is not constant and changes depending on shooting conditions or the like. Specifically, the exposure time T4 changes depending on a setting of the aperture mechanism, or the like. The readout time T5 or the development time T6 changes depending on a size (number of pixels) of the imaging element 51a, or the like.

Visually induced motion sickness is caused by the display delay time in addition to being caused by the image displayed on the display unit being blurred due to camera shake or the like.

Specifically, a case in which a photographer swings the camera from left to right while maintaining a state in which the photographer looks at EVF 4 and then returns the camera from right to left will be described.

Figure 4:
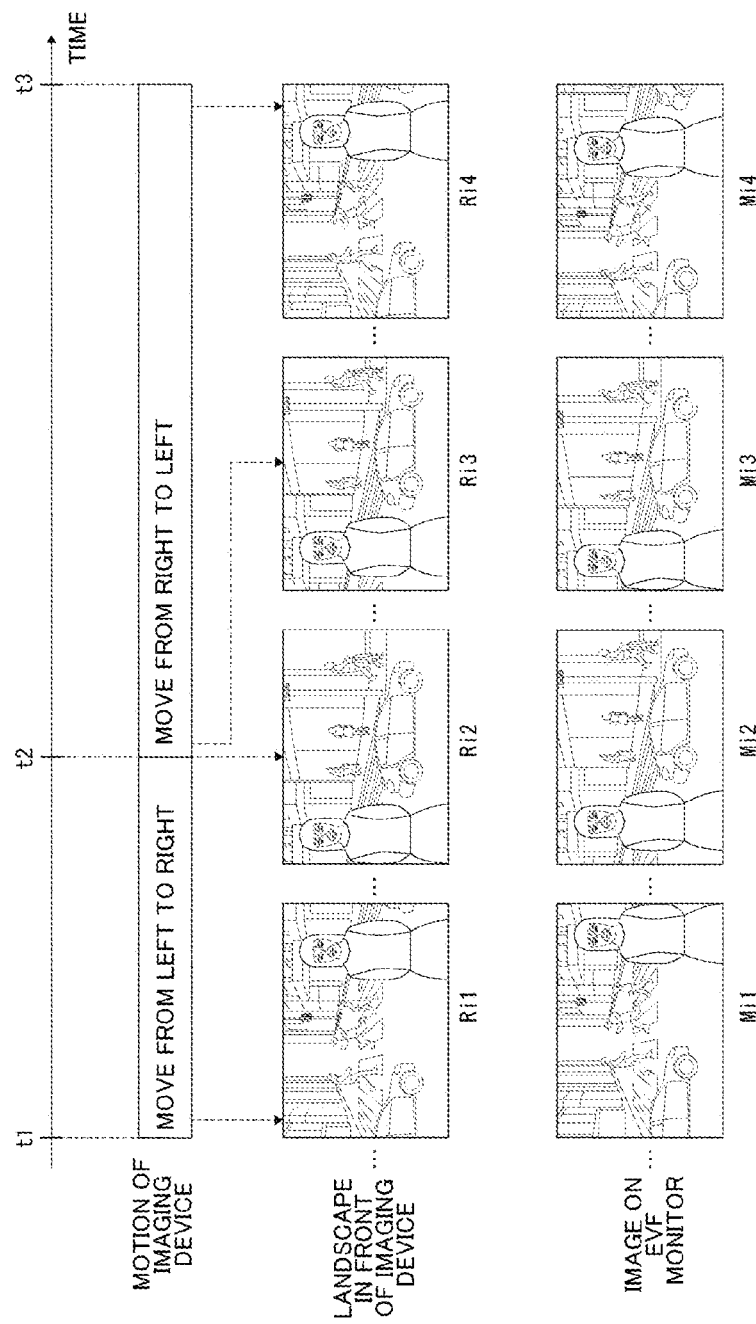
FIG. 4 is a diagram illustrating a delay of a display image.

FIG. 4 schematically illustrates a motion of the imaging device 1, a landscape in front of the imaging device 1, and respective changes in display images displayed on the EVF monitor 7 of the imaging device 1 over time. Images Ri1, Ri2, Ri3, and Ri4 in FIG. 4 are landscapes in front of the imaging device 1, respectively. Further, the images Mi1, Mi2, Mi3, and Mi4 in FIG. 4 are display images displayed on the EVF monitor 7, respectively.

First, it is assumed that the imaging device 1 moves from left to right from time t1 to time t2, and moves from right to left from time t2 to time t3.

In this case, in the landscape in front of the imaging device 1, the subject appears as if relatively moving from right to left from time t1 to time t2. That is, in the image Ri1 (the image immediately after time t1) and the image Ri2 (the image at a point in time of time t2) seen by an observer, the subject is shown on the left side in the image Ri2.

The image Ri3 shows a landscape in front of the imaging device 1 when a short time has elapsed from time t2. Since the image Ri3 is in a state in which the imaging device 1 has moved slightly to the left as compared with the image Ri2, the subject on the image slightly moves to the right. Further, in the image Ri4 immediately before time t3 elapses, the subject has moved to the right as compared with the image Ri3.

The image Ri2 is an image in which the subject is located on the leftmost side in a series of motions of the imaging device 1.

On the other hand, in the display image displayed on the EVF monitor 7, when the image Mi2 when time t2 has elapsed is compared with the image Mi3 when a short time has elapsed from time t2, the subject in the image Mi3 has moved to the left. That is, a timing at which the subject is positioned on the leftmost side arrives with a slight delay due to the display delay time. Accordingly, the motion of the imaging device 1, that is, the motion of a head of the photographer and a motion of the subject visually recognized through the EVF monitor 7 are opposite to each other in a time in which the image Mi2 and the image Mi3 are displayed. Specifically, although the imaging device 1 moves from right to left, the subject in the EVF monitor 7 looks as if the subject does not move from left to right but moves in an opposite direction (from right to left).

Since actual visual information (the subject moves from right to left) deviates from an expected motion (from left to right) of the subject from a motion (from right to left) of a face of the photographer, there is concern that the photographer may feel a sense of unease and visually-induced motion sickness be caused.

Such visually induced motion sickness can occur due to not only the motion of the imaging device 1 in a left and right direction, but also yawing, movement in an up and down direction, pitching, movement of the imaging device 1 in a Z-axis direction, and rolling.

The imaging device 1 executes various types of processing in order to reduce or prevent such visually induced motion sickness.

Hereinafter, these various types of processing will be described with reference to the accompanying drawings.

3. Generation of Modified Display Image Data

3-1. Calculation of Modification Amount

The signal processing unit 52 performs modification processing (signal processing) for reducing the visually induced motion sickness caused by the display delay time. For example, the modification processing is performed such that the subject is displayed as being shifted as compared with a case in which the display image has been displayed on the display unit without the modification processing. In this case, the amount of shift is defined as a modification amount (including an amount of movement due to translation, an amount of movement due to enlargement and reduction, and an amount of movement due to rotational movement) in the modification processing.

Describing with reference to FIG. 4, a position (the image Ri2) of the landscape (subject) that is actually directly visually recognized at time t2 deviates from a position (image Mi2) of the subject displayed on the EVF monitor 7 at that point in time, and the position of the subject displayed on the EVF monitor 7 is displayed on the right side as compared with an actual landscape.

Therefore, it is possible to reduce (or eliminate) the deviation between an actual position of the subject and the position of the subject displayed on the EVF monitor 7 by performing display processing (modification processing) for shifting the position of the subject displayed on the EVF monitor 7 to the left.

In order to perform such display processing, the imaging device 1 of the present embodiment calculates an amount of change in the position or posture (orientation) of the imaging device 1, and calculates the amount of shift according to the amount of change.

It is necessary to ascertain how long the display delay time is in order to calculate the amount of change in the position or posture of the imaging device 1. For example, when a frame rate is 60 Hz and the display delay is 3 frames, the display delay time is 50 msec (=1 sec/60 Hz×3 frames).

That is, under this condition, the amount of change in the position or posture of the imaging device 1 during 50 msec is calculated, and the amount of shift of the display image data is calculated according to the amount of change.

First, calculation of the amount of movement of the imaging device 1 in a space and the change in posture will be described.

In the following description, the amount of change in the position or posture of the imaging device 1 and the amount of change in the position or posture of the imaging element 51a are regarded as being the same. It can be considered that an actual amount of change of the imaging element 51a is measured by providing various sensors for measuring the amount of change near the imaging element 51a.

Figure 5:
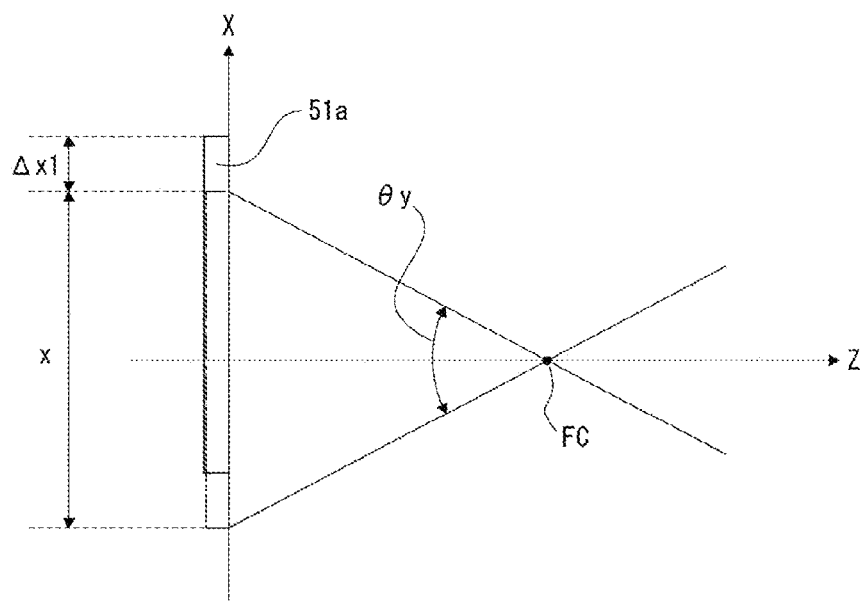
FIG. 5 is a diagram illustrating an amount of change due to translation in an X-axis direction.

A case in which the imaging device 1 has been translated by a distance $\Delta x1$ in an X-axis direction (a left and right direction) will be described with reference to FIG. 5. FIG. 5 illustrates the imaging element 51a and a focal center FC thereof.

When the imaging device 1 has moved by the distance $\Delta x1$ in the X-axis direction, an amount of movement of the imaging element 51a also becomes $\Delta x1$. $\Delta x1$ has a positive value when the imaging device 1 has moved in a predetermined direction in the X-axis direction, and has a negative value when the imaging device 1 has moved in a direction opposite to the predetermined direction.

Figure 6:
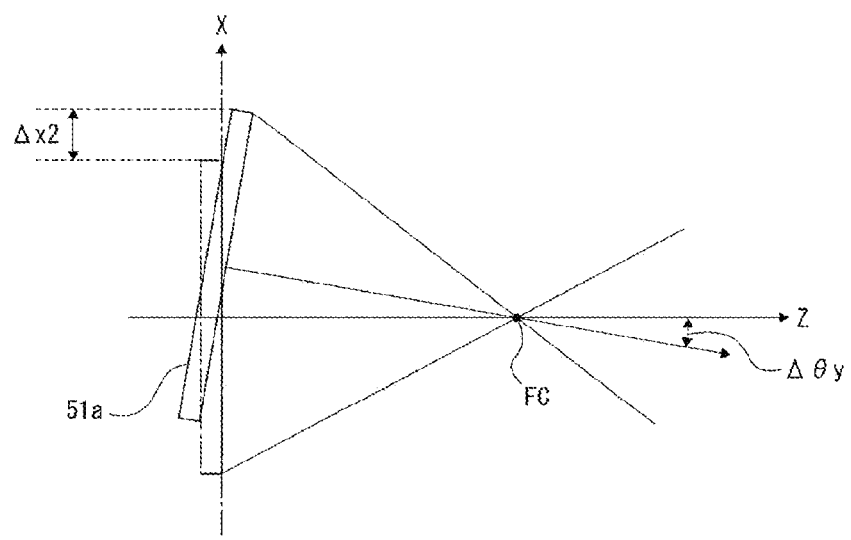
FIG. 6 is a diagram illustrating an amount of change due to yawing.

Next, a change in posture of the imaging element 51a when the imaging device 1 rotates (yaw) about the Y-axis will be described with reference to FIG. 6. The change in posture of the imaging element 51a due to yawing of the imaging device 1 can be approximated as translation in the X-axis direction of the imaging device 1. An approximate amount of movement $\Delta x2$ in the X-axis direction in this case can be calculated by $x \times \Delta\theta y/\theta y$ when a size of the imaging element 51a in the X-axis direction (that is, a width of the imaging element 51a) is x, an angle of view of the imaging element 51a in the X-axis direction is $\theta y$, and a rotation angle of yawing is $\Delta\theta y$.

This approximate equation has a positive value in the case of rotation in a predetermined direction, and has a negative value in the case of rotation in a direction opposite to the predetermined direction.

From the above, the translation and yawing of the imaging device 1 in the X-axis direction can be regarded as the translation of the imaging element 51a in the X-axis direction, and an amount of movement thereof is calculated by $\Delta x1 + x \times \Delta\theta y/\theta y$.

Figure 7:
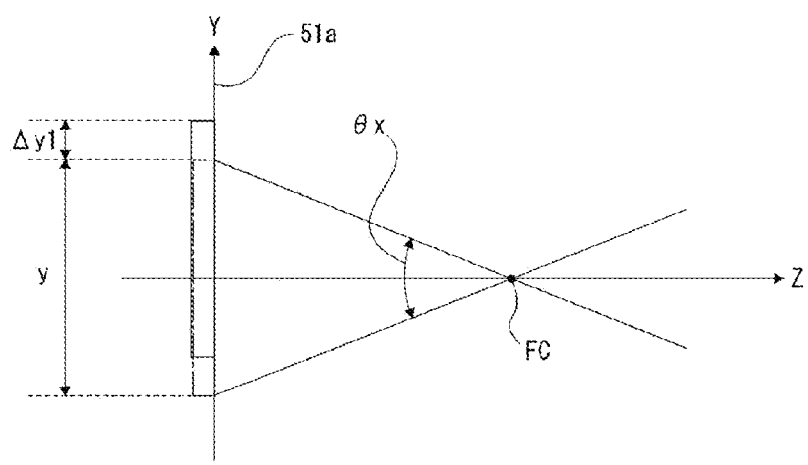
FIG. 7 is a diagram illustrating an amount of change due to translation in a Y-axis direction.

Next, a case in which the imaging device 1 has translated by a distance $\Delta y1$ in the Y-axis direction (up and down direction) will be described with reference to FIG. 7. In this case, an amount of movement of the imaging element 51a is also Δy1. Δy1 has a positive value when the imaging device 1 has moved in a predetermined direction in the Y-axis direction, and has a negative value when the imaging device 1 has moved in a direction opposite to the predetermined direction.

Figure 8:
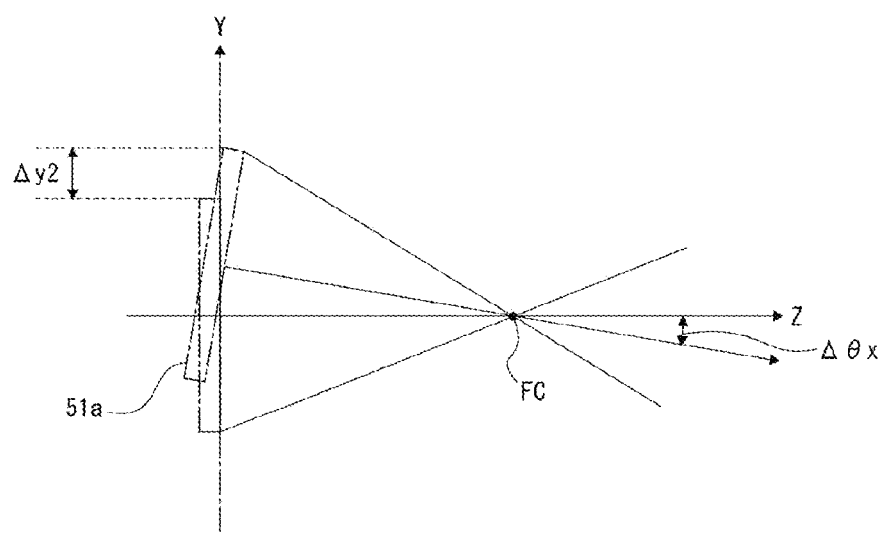
FIG. 8 is a diagram illustrating an amount of change due to pitching.

Next, the change in posture of the imaging element 51a when the imaging device 1 rotates (pitches) around the X-axis will be described with reference to FIG. 8. The change in posture of the imaging element 51a due to pitching of the imaging device 1 can be approximated as the translation of the imaging device 1 in the Y-axis direction. An approximate amount of movement Δy2 in the Y-axis direction in this case can be calculated by y×Δθx/θx, in which y is a size of the imaging element 51a in the Y-axis direction (that is, a height of the imaging element 51a), θx is an angle of view of the imaging element 51a in the Y-axis direction, and Δθx is a rotation angle of pitching.

This approximate equation has a positive value in the case of rotation in a predetermined direction, and has a negative value in the case of rotation in a direction opposite to the predetermined direction.

From the above, the translation and pitching of the imaging device 1 in the Y-axis direction can be regarded as the translation of the imaging element 51a in the Y-axis direction, and an amount of movement thereof is calculated by Δy1+y×Δθx/θx.

As described above, the translation, yawing, and pitching in the X-axis direction and the Y-axis direction in the imaging device 1 can shift the display image data in the X-axis direction and the Y-axis direction, so that a deviation of the display image based on the display delay time can be reduced or eliminated. Information on the optical system 50 is required for calculation of the amount of shift. For example, the amount of shift can be calculated using information on a focal length, information on an angle of view, or the like.

Next, a case in which the imaging device 1 has translated in the Z-axis direction, that is, a case in which the imaging device 1 moves toward the subject or moves away from the subject will be described with reference to FIG. 9.

Figure 9:
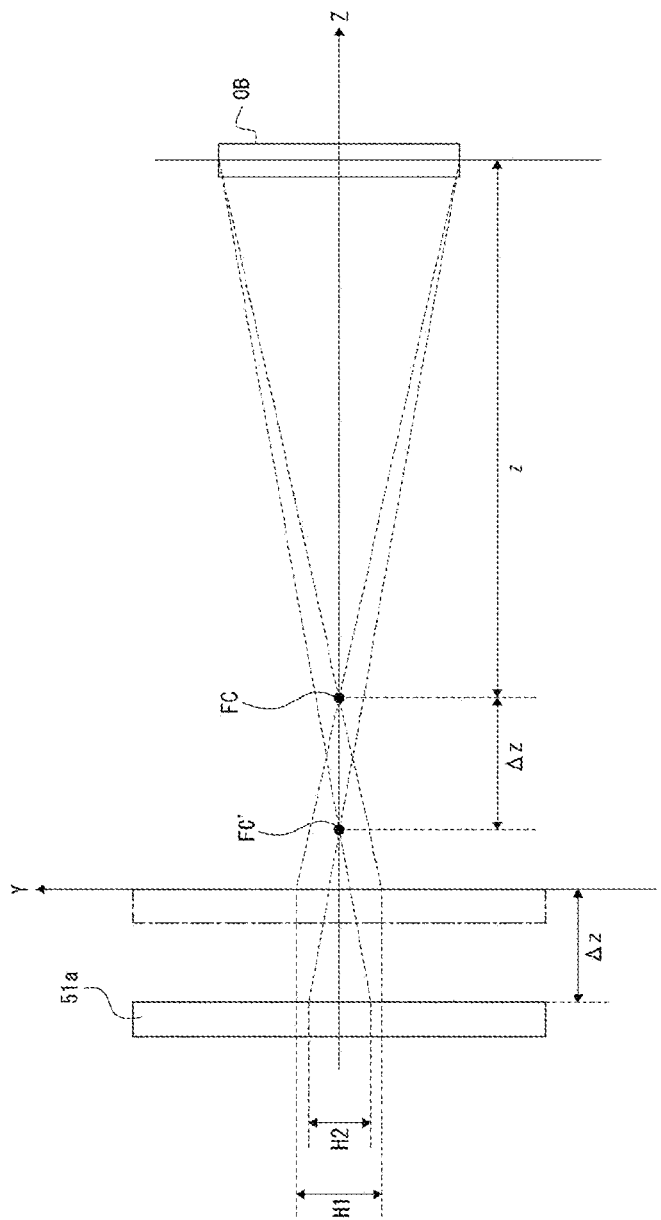
FIG. 9 is a diagram illustrating an amount of change due to translation in a Z-axis direction.

FIG. 9 illustrates a case in which the imaging element 51a is moved from a position indicated by an alternate long and short dash line to the photographer. That is, a subject OB is moving away when viewed from the imaging element 51a.

As the imaging element 51a moves, the focal center FC also moves to a focal center FC'. A magnification of a change in a size of an area in which the subject light on the imaging element 51a is condensed by the movement of the imaging element 51a can be calculated by z/(z+Δz), in which z is a distance between the focal center FC before movement and the subject OB, and Δz is a moving distance (moving distance of the focal center) in the Z-axis direction of the imaging element 51a. In FIG. 9, a height H1 of an image of the subject OB formed on the imaging element 51a before movement and a height H2 of an image formed on the imaging element 51a after movement are shown.

Therefore, a size of the subject OB after the movement can be expressed by multiplying the display image data by z/(z+Δz) using the display image data captured before the movement of the imaging element 51a.

Thus, for the translation of the imaging device 1 in the Z-axis direction, it is possible to eliminate the display delay due to the display delay time by enlarging or reducing the display image data (for example, applying digital zoom again). An enlargement ratio or reduction ratio can be referred to as an amount of modification that is used in the modification processing for generating the modified display image data.

Figure 10:
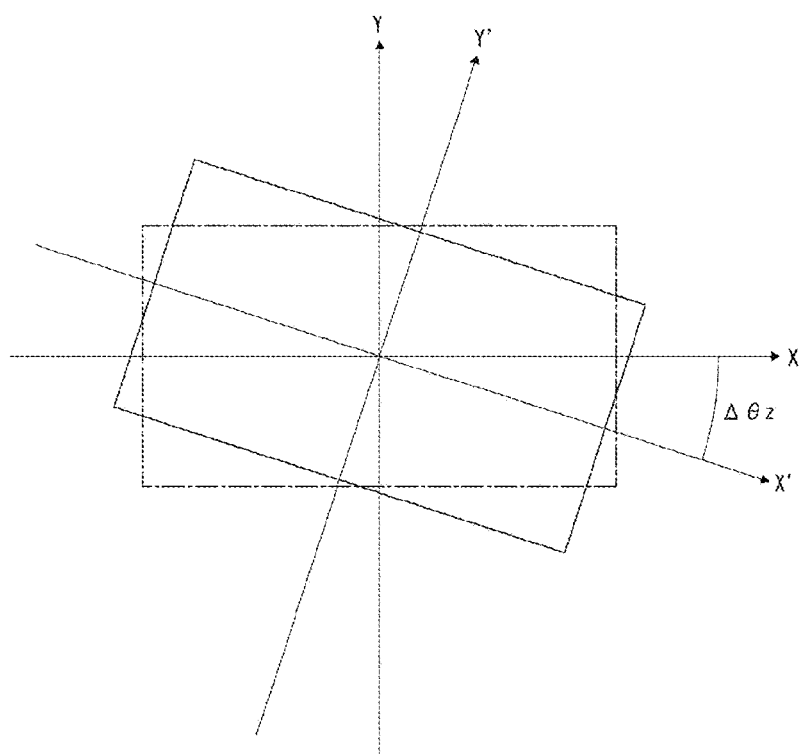
FIG. 10 is a diagram illustrating an amount of change due to rolling.

Finally, the change in posture of the imaging element 51a when the imaging device 1 rotates around a Z-axis will be described with reference to FIG. 10.

Rolling of the imaging device 1 can be regarded as the same rotation of the imaging element 51a. Rolling of the imaging element 51a can be supported by rotations of the X-axis and the Y-axis. That is, it is possible to eliminate the display delay due to the display delay time using the following equation.

$$\begin{bmatrix} X' \\ Y' \end{bmatrix} = \begin{bmatrix} \cos \Delta\theta_z & -\sin \Delta\theta_z \\ \sin \Delta\theta_z & \cos \Delta\theta_z \end{bmatrix} \begin{bmatrix} X \\ Y \end{bmatrix} \qquad \text{[Math. 1]}$$

Rotation angles of the X-axis and the Y-axis can be referred to as an amount of modification that is used in the modification processing for generating the modified display image data.

As described above, change in the position and posture of the imaging device 1 is regarded as translation in the X-axis, Y-axis, and Z-axis directions, and yawing, pitching, and rolling rotations, making it possible to eliminate the display delay due to the display delay time.

3-2. First Example of Modified Display Image Data

Specifically, an example of the modified display image data generated by the signal processing unit 52 will be described with reference to the accompanying drawings in order to eliminate the display delay due to the display delay time when the imaging device 1 translates in the X-axis direction.

Figure 11:
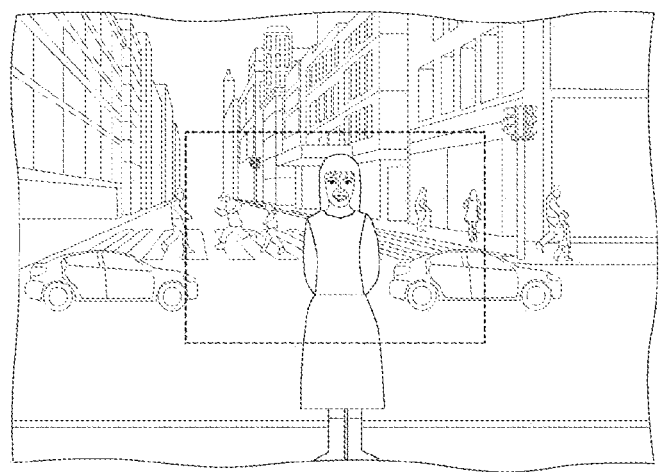
FIG. 11 is a diagram illustrating an example of a landscape that is an imaging target.

FIG. 11 illustrates an example of a landscape that the imaging device 1 is about to image. A rectangular dotted line illustrated in FIG. 11 indicates a current angle of view of the imaging device 1.

Figure 12:
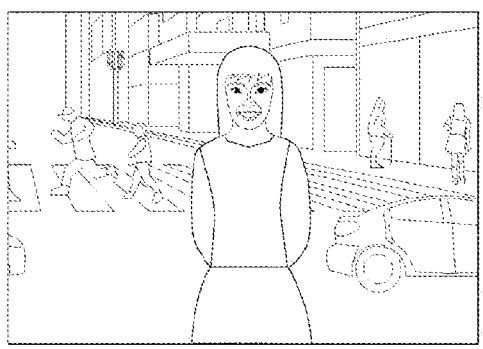
FIG. 12 is a diagram illustrating a current angle of view of the imaging device.

FIG. 12 illustrates an angle of view in current imaging according to a current angle of view in imaging of the imaging device 1, and display image data according thereto is displayed on the EVF monitor 7 after, for example, about 50 msec due to the display delay time.

Figure 13:
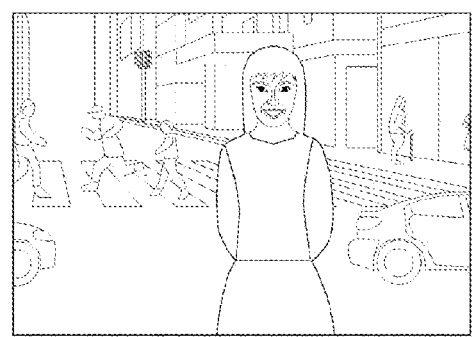
FIG. 13 is a diagram illustrating an image currently displayed on a display unit.

FIG. 13 is display image data (without modification processing) displayed on the EVF monitor 7 of the imaging device 1, and is an image according to an angle of view at a position of the imaging device 1 50 msec ago. That is, the angle of view deviates to the right from a current angle of view indicated by a dotted line in FIG. 11.

Figure 14:
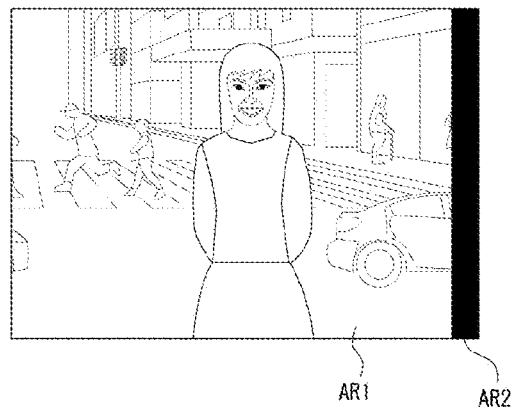
FIG. 14 is a diagram illustrating a first example of modified display image data.

FIG. 14 illustrates the modified display image data generated by the processing of the signal processing unit 52 of the imaging device 1, and the display image data captured according to the angle of view of the imaging device 1 50 msec ago (see FIG. 13) is shifted to the left.

Specifically, a state in which an origin position (for example, an upper left pixel) in data in the cropping range of the captured image data does not match an origin position in the display image data is a shifted state.

Further, the "cropping range" is an image range cropped in image stabilization processing in a case in which electronic image stabilization is applied. In a case in which the electronic image stabilization is not applied (including a case in which optical image stabilization is adopted), the image range is set to a predetermined image range (for example, an effective pixel range).

However, since the display image data is shifted and the modified display image data is generated, an area of a part of the modified display image data is defined as an area that cannot be filled with the captured image data in the cropping range in the imaging element 51a. In the following description, an area in which the captured image data in the cropping range of the imaging element 51a is displayed in the display area of the display unit is referred to as a "first area AR1", and the other area is referred to as a "second area AR2".

In the example illustrated in FIG. 14, the second area AR2 is filled with a black image.

Pixel data (white, gray, or the like) having a specific brightness other than the black image may be used for the second area AR2. Further, the pixel data having the specific brightness may be, for example, pixel data such as a striped pattern in which pixel data having a first specific brightness and pixel data having a second specific brightness are repeated for each certain pixel.

Since a state (a position, size, or the like) of the subject in an angle of view at a moment when the imaging device 1 actually captures the subject substantially matches a state of the subject displayed on the display unit such as the EVF monitor 7 when the display based on the modified display image data shown in FIG. 14 is performed, it is difficult for the photographer to cause visually induced motion sickness.

3-3. Second Example of Modified Display Image Data

Respective pixels of the imaging element 51a are classified into pixels located in the cropping range and pixels located outside the cropping range. Captured image data of the pixels located outside the cropping range is not used for the display image data to be displayed on the display unit unless the captured image data belongs to the cropping range newly set at the time of image stabilization processing.

In a second example of the modified display image data, captured image data generated by using pixels located outside the cropping range is used for a part of the second area AR2.

Figure 15:
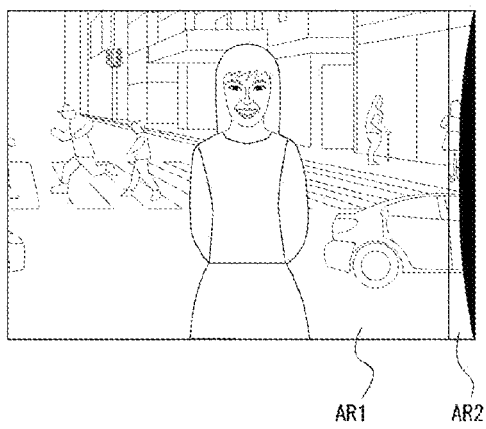
FIG. 15 is a diagram illustrating a second example of modified display image data.

Specifically, this is illustrated in FIG. 15. As illustrated in FIG. 15, captured image data acquired from pixels in an area that was not originally used by correcting barrel distortion (that is, captured image data outside the cropping range) is used for the part of the second area AR2.

Using the captured image data outside the cropping range for at least a part of the second area AR2, it is possible to reduce an area in which the pixel data having the specific brightness is used. Further, using the captured image data captured by the imaging element 51a, it is possible to narrow the display area in which the pixel data having the specific brightness is used without causing the photographer to feel uncomfortable.

3-4. Third Example of Modified Display Image Data

A third example of the modified display image data is an example in which an area in which the display image data is displayed in the display unit is smaller than an entire display area of the display unit. That is, a size in which the captured image data captured by the pixels in the cropping range of the imaging element 51a is displayed as the display image data is smaller than the entire display area of the display unit.

Figure 16:
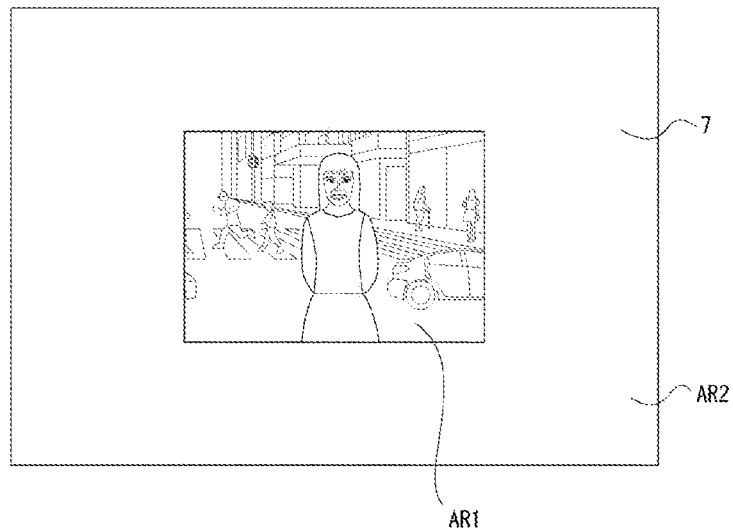
FIG. 16 is a diagram illustrating an example in which display image data is displayed to be small with respect to an entire display area.

This will be specifically described with reference to FIG. 16.

A part of a display area of the EVF monitor 7 as a display unit is the first area AR1, and a remaining part is the second area AR2.

The first area AR1 is an area smaller than an entire display area of the EVF monitor 7 even when all the captured image data in the cropping range is used as the display image data.

When a deviation of the display position due to the display delay time occurs due to the motion of the imaging device 1, the signal processing unit 52 generates the modified display image data in which the display image data has been shifted, by performing the above-described modification processing or the like. In this case, the display area of the captured image data in the cropping range is set to be smaller than the entire display area of the EVF monitor 7, so that all of the captured image data in the cropping range fits into the display area of the EVF monitor 7 even when the modified display image data is shifted to some extent with respect to the display image data (see FIG. 17). That is, this can be realized by changing a display position of the display image data based on the captured image data on the display unit.

Accordingly, since the entire captured image can be visually recognized (the entire angle of view can be seen), it is possible to ensure ease of shooting.

3-5. Fourth Example of Modified Display Image Data

In a fourth example of the modified display image data, an icon (a guide frame) for indicating an area that will be shot when the photographer has pressed a shooting button is displayed on the display unit.

This will be specifically described with reference to FIGS. 17 and 18.

Figure 17:
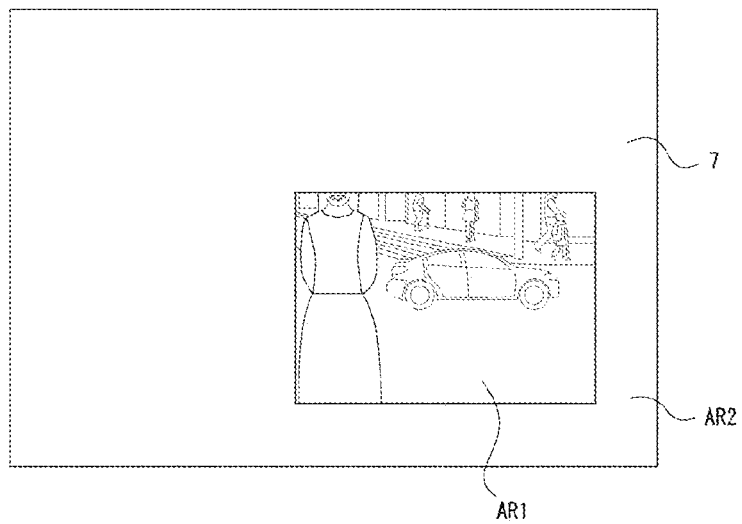
FIG. 17 is a diagram illustrating a third example of modified display image data.

A first area AR1 illustrated in FIG. 17 is an area in which an image due to subject light focused on the imaging element 51a was displayed a little while ago (for example, 50 msec ago). That is, when the shooting button or the like has been pressed at a moment when the EVF monitor 7 has been in a state illustrated in FIG. 17, an area of an image (or moving image) to be actually recorded is an area different from the first area AR1.

In this example, this area is indicated by a dotted line. Specifically, the signal processing unit 52 generates the modified display image data shown in FIG. 18 by superimposing a rectangular dotted line for indicating an imaging area IA on the modified display image data shown in FIG. 17.

Figure 18:
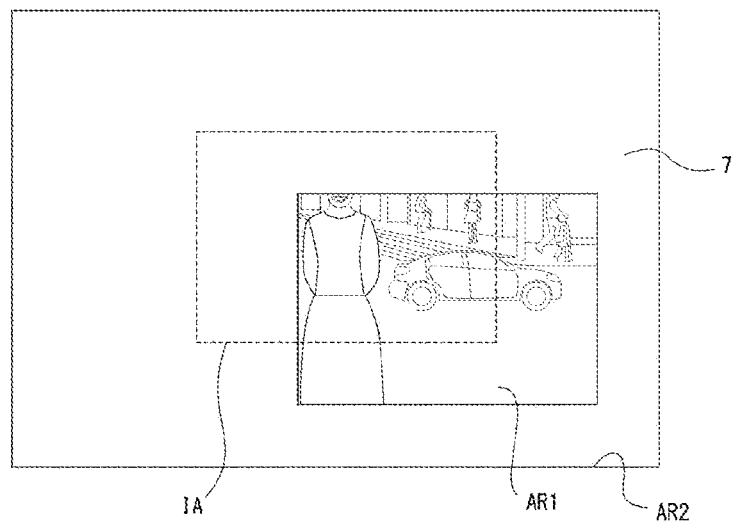
FIG. 18 is a diagram illustrating a fourth example of the modified display image data.

By the modified display image data shown in FIG. 18 being displayed on the EVF monitor 7, the photographer can ascertain a range in which shooting is possible on the basis of a current position or posture of the imaging device 1.

That is, the captured image data captured just a few moments ago is shifted from a central portion and displayed to prevent visually induced motion sickness, and a shooting range in which shooting is possible can be ascertained according to a current state of the imaging device 1.

3-6. Fifth Example of Modified Display Image Data

Figure 19:
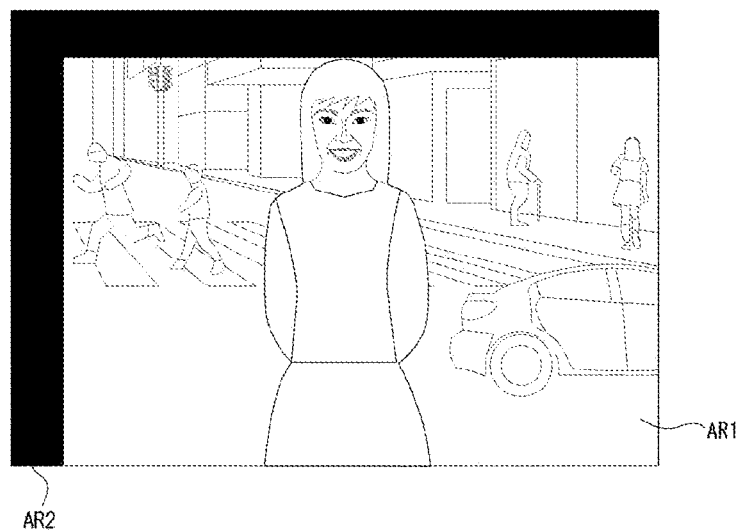
FIG. 19 is a diagram illustrating an example in which a size of a second area varies depending on a type of lens.
Figure 20:
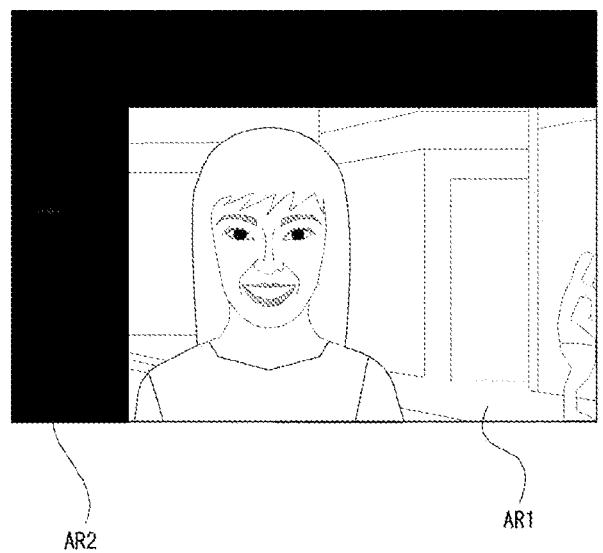
FIG. 20 is a diagram illustrating an example in which the size of the second area varies depending on a type of lens, and is a diagram illustrating an example in which the second area is larger than that in FIG. 19.

A fifth example of the modified display image data is an example in which the modified display image data is generated according to information of the optical system 50. For example, information on the focal length of the optical system 50 is acquired, and a future amount of shift is calculated according to the focal length. Accordingly, for example, when a wide-angle lens is used as the optical system 50, the angle of view is wide and thus the amount of shift becomes small (see FIG. 19). On the other hand, when a telephoto lens is used as the optical system 50, the angle of view is narrow and the amount of shift becomes large (see FIG. 20).

When the amount of shift is too large in a case in which the telephoto lens is used, there is concern that the first area AR1 displayed on the EVF monitor 7 becomes a small area that is too close to an end of the display area, and it is difficult for the photographer to see the first area AR1. Therefore, an upper limit value may be set for the amount of shift so that the first area AR1 does not become smaller than a predetermined area. For example, a configuration may be made to determine the amount of shift so that an area of the second area AR2 is smaller than an area of the first area AR1.

This makes it possible to prevent visually induced motion sickness while eliminating the difficulty of seeing.

3-7. Sixth Example of Modified Display Image Data

A sixth example of the modified display image data is an example in which the imaging device 1A including a sub-imaging unit 9 is used.

Specifically, a configuration of the imaging device 1A will be described.

Figure 21:
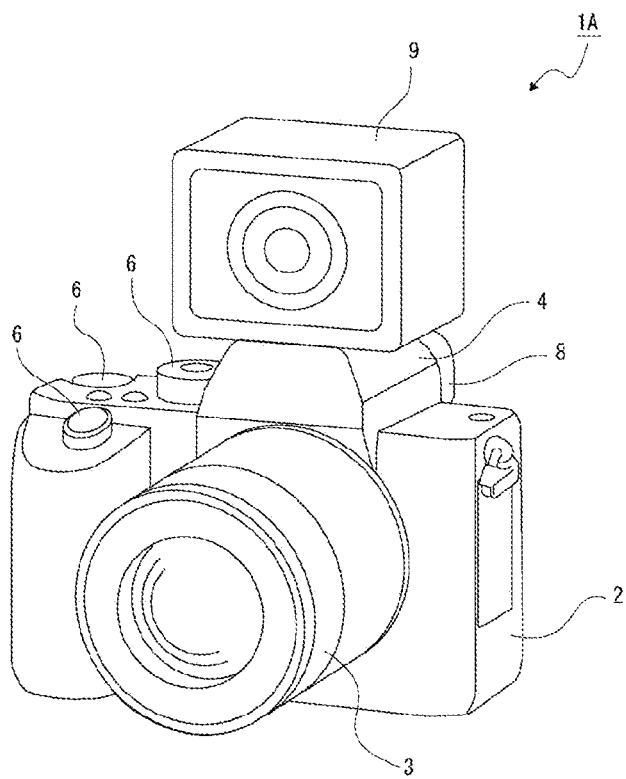
FIG. 21 is a perspective view of an imaging device including a sub-imaging unit.
Figure 22:
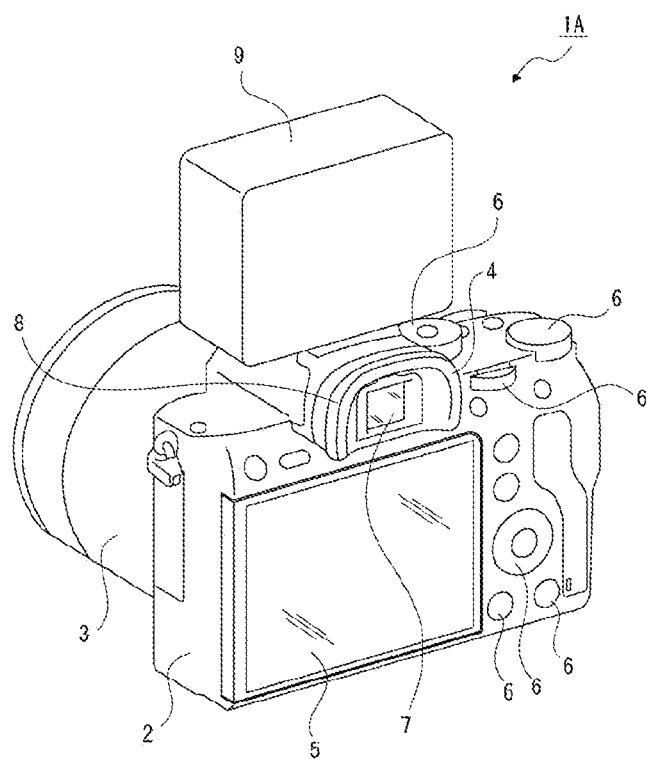
FIG. 22 is a perspective view of an imaging device including a sub-imaging unit from another angle.

The imaging device 1A includes the sub-imaging unit 9, in addition to the camera housing 2, the lens housing 3, the EVF 4, and the rear monitor 5. The camera housing 2 is provided with various operators 6 (see FIGS. 21 and 22).

The sub-imaging unit 9 includes a lens group 11, an imaging element, and the like disposed in a housing 10.

Figure 23:
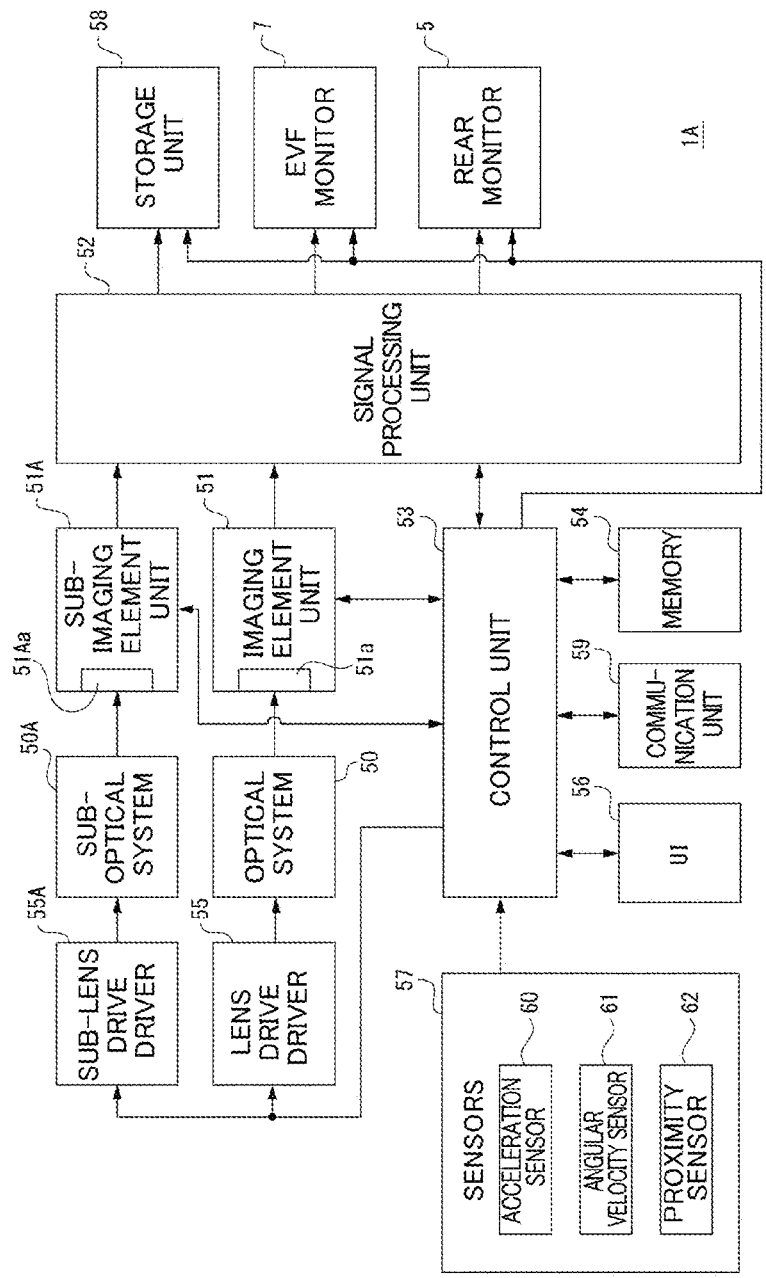
FIG. 23 is a block diagram of an imaging device including a sub-imaging unit.

FIG. 23 is a block diagram of the imaging device 1A.

The imaging device 1A includes a sub-optical system 50A, a sub-imaging element unit 51A, and a sub-lens drive driver 55A for realizing an imaging operation of the sub-imaging unit 9, in addition to the optical system 50, the imaging element unit 51, the signal processing unit 52, the control unit 53, the memory 54, the lens drive driver 55, the user interface (UI) 56, the sensors 57, the storage unit 58, and the communication unit 59.

The sub-optical system 50A includes various lenses such as an incidence end lens, a zoom lens, a focus lens, and a condenser lens, an aperture mechanism, and the like. The aperture mechanism performs exposure control by adjusting, for example, an aperture amount of a lens or an iris (aperture) so that sensing is performed in a state in which signal charge is not saturated and is in a dynamic range.

The sub-imaging element unit 51A includes a sub-imaging element 51Aa.

The sub-imaging element unit 51A includes, for example, a CCD-type or CMOS-type sub-imaging element 51Aa. A sensor surface of the sub-imaging element 51Aa includes a sensing element in which a plurality of pixels are two-dimensionally arranged.

The sub-imaging element unit 51A executes CDS processing, AGC processing, and the like on the electrical signal obtained by photoelectric conversion of the light received by the sub-imaging element 51Aa, and performs A/D conversion processing. Then, the captured image data as digital data is output to the signal processing unit 52 in a subsequent stage.

In description of this example, imaging using the optical system 50 and the imaging element unit 51 is defined as imaging using a main imaging unit, and imaging using the sub-optical system 50A and the sub-imaging element unit 51A is defined as imaging using the sub-imaging unit 9.

A maximum angle of view of the sub-imaging unit 9 is made larger than a maximum angle of view of the main imaging unit. Further, the number of pixels of the sub-imaging element 51Aa may be smaller than that of the imaging element 51a.

The sixth example of the modified display image data is an example in which the captured image data captured by the sub-imaging unit 9 is used in the second area AR2.

This will be specifically described with reference to FIG. 24.

Figure 24:
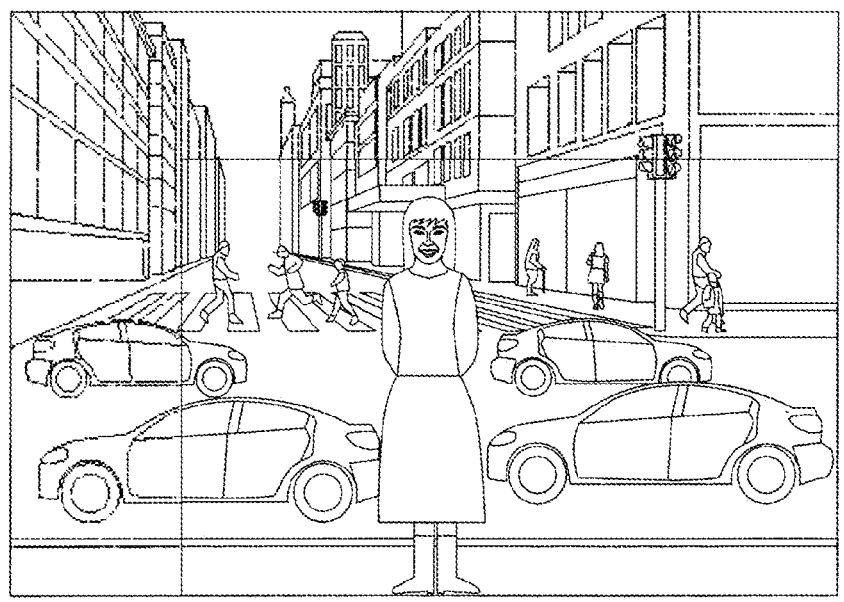
FIG. 24 is a diagram illustrating a sixth example of the modified display image data.

FIG. 24 illustrates a state in which a display based on modified display image data in which captured image data (first image data) captured by the main imaging unit is used for the first area AR1 and captured image data (second image data) captured by the sub-imaging unit 9 is used for the second area AR2 has been performed.

As illustrated in FIG. 24, captured image data in low resolution is used for the second area AR2.

When the change in the position or posture of the imaging device 1A is equal to or less than a certain level, the second area AR2 is an area located at the edge of the display area of the display unit, and thus, the photographer does not feel a sense of discomfort even when an image is slightly rough. Further, since the pixel data having the specific brightness is a display image closer to a landscape actually captured by the eyes than that used for the second area AR2, the photographer can further visually recognize a picture without a sense of discomfort.

Specifically, first, the signal processing unit 52 of the imaging device 1A performs processing of ascertaining a range of the first area AR1. Next, an area used for the second area AR2 in the second image data is specified in consideration of, for example, a difference between an angle of view of the main imaging unit and an angle of view of the sub-imaging unit 9. Further, resolution conversion of the image data in the area is performed so that display image data for a display in the second area AR2 in the display unit is generated, and modified display image data is generated from the display image data and the first image data to be displayed in the first area AR1.

Accordingly, generation of the modified display image data for a display in the display unit such as the EVF monitor 7 is performed.

Since the second area AR2 is an area located at the edge of the display area of the display unit, boundaries of the first image data displayed in the first area AR1 and the second image data displayed in the second area AR2 may not be exactly aligned. That is, an area used for the second area AR2 in the second image data may be roughly specified. Accordingly, it is possible to reduce the amount of calculation.

3-8. Seventh Example of Modified Display Image Data

A seventh example of the modified display image data is an example in which the modified display image data is generated by using the captured image data used for the first area AR1 as the display image data of the second area AR2.

Details will be described on the basis of the accompanying drawings.

Figure 25:
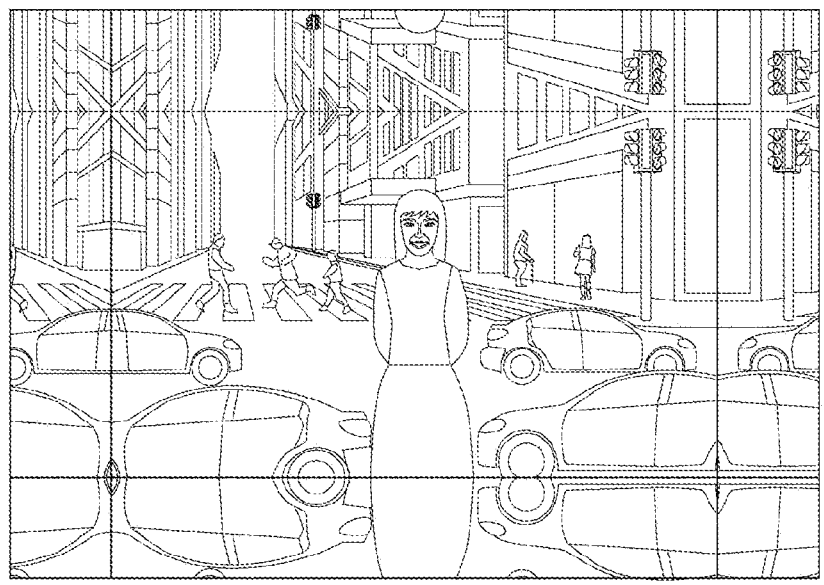
FIG. 25 is a diagram illustrating developed image data.

FIG. 25 illustrates image data in which the captured image data in the cropping range used as image data to be displayed in the first area AR1 is folded back and developed to the outside along upper, lower, left, and right edges of the range.

Hereinafter, the image data shown in FIG. 25 will be referred to as "developed image data".

Figure 26:
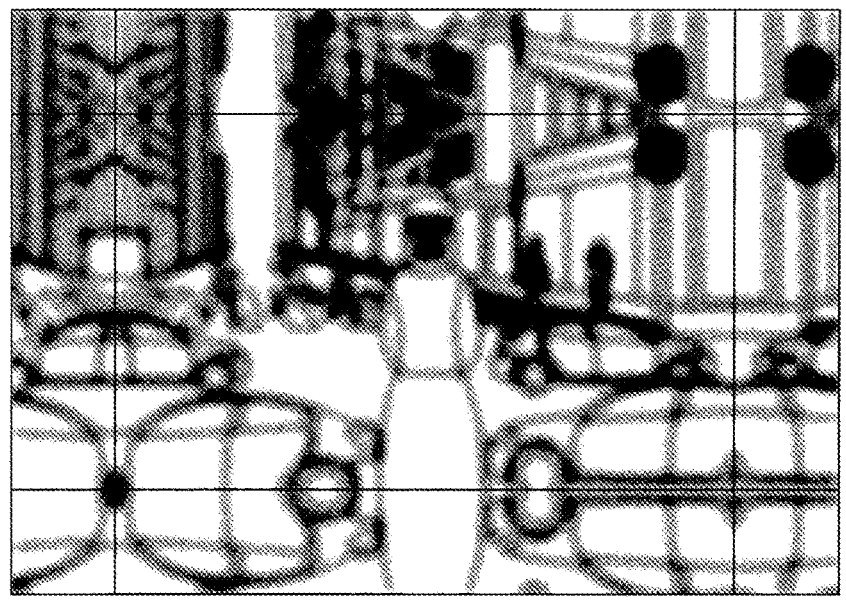
FIG. 26 is a diagram illustrating blurred developed image data.

FIG. 26 illustrates image data generated by performing blurring processing on the developed image data. This image data is referred to as "blurred developed image data".

This example is an example in which the blurred developed image data shown in FIG. 26 is used for the image displayed in the second area AR2 of the modified display image data.

Figure 27:
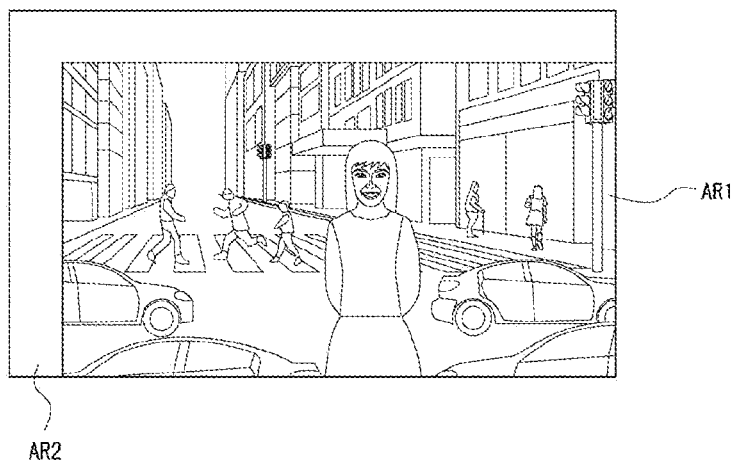
FIG. 27 is a diagram illustrating a state in which an image within a cropping range has been shifted.

FIG. 27 illustrates a state in which the image in the cropping range in the captured image data has been shifted according to change in position or posture of the imaging device 1 over time as in each of the above-described examples. When the modified display image data is generated in this state and displayed, the second area AR2 in the display image displayed on the display unit such as the EVF monitor 7 is interpolated with the pixel data having specific brightness.

Figure 28:
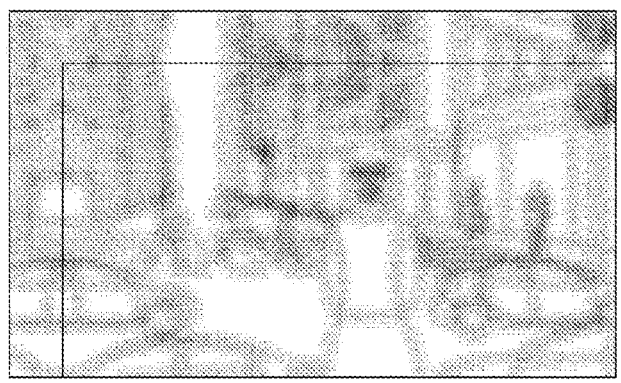
FIG. 28 is a diagram illustrating a part of the blurred developed image data.

FIG. 28 illustrates a part of the blurred developed image data generated from the captured image data. An area to be cropped from the blurred developed image data is determined by a position of the first area AR1 in FIG. 27. Specifically, an area of a part in FIG. 26 is cropped so that a position of a folding line (a folding line when the developed image data is generated) in the blurred developed image data of FIG. 26 overlaps a boundary line of the cropping range of FIG. 27.

Figure 29:
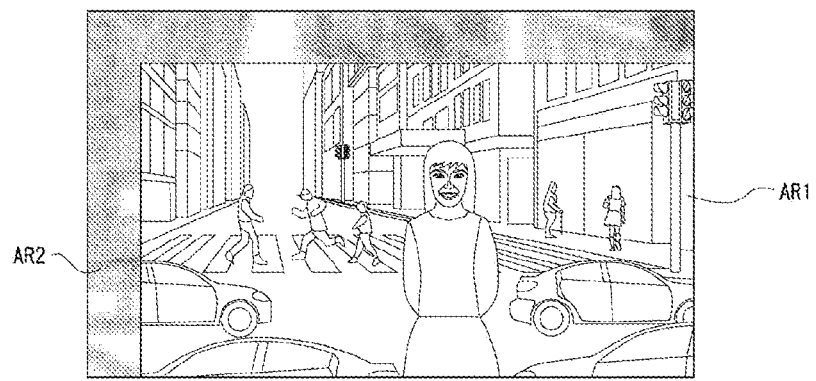
FIG. 29 is a diagram illustrating a seventh example of the modified display image data.

FIG. 29 illustrates the modified display image data generated by using the first area AR1 in FIG. 27 and the second area AR2 in FIG. 28.

As illustrated in FIG. 29, by the data in the cropping range in the captured image data captured by the imaging device 1 being used for the second area AR2, it is possible to reduce the sense of discomfort of the photographer when the modified display image data has been visually recognized. Further, since change in a brightness value or a color tone becomes gentle when a target is set with respect to a folding line, it is possible to further reduce the sense of discomfort of the photographer. Further, image data used for the second area AR2 is blurred, making it possible to further reduce the sense of discomfort of the photographer.

The image data used for the second area AR2 may be image data shown in FIG. 25 not subjected to the blurring processing.

Further, the image data used for the second area AR2 may not a blurred image in which blurred developed image data is out of focus, but may be low-resolution image data generated by performing resolution conversion processing on the developed image data.

4. Flowchart

A step of generating modified display image data will be described using the flowchart in the accompanying drawings.

Figure 30:
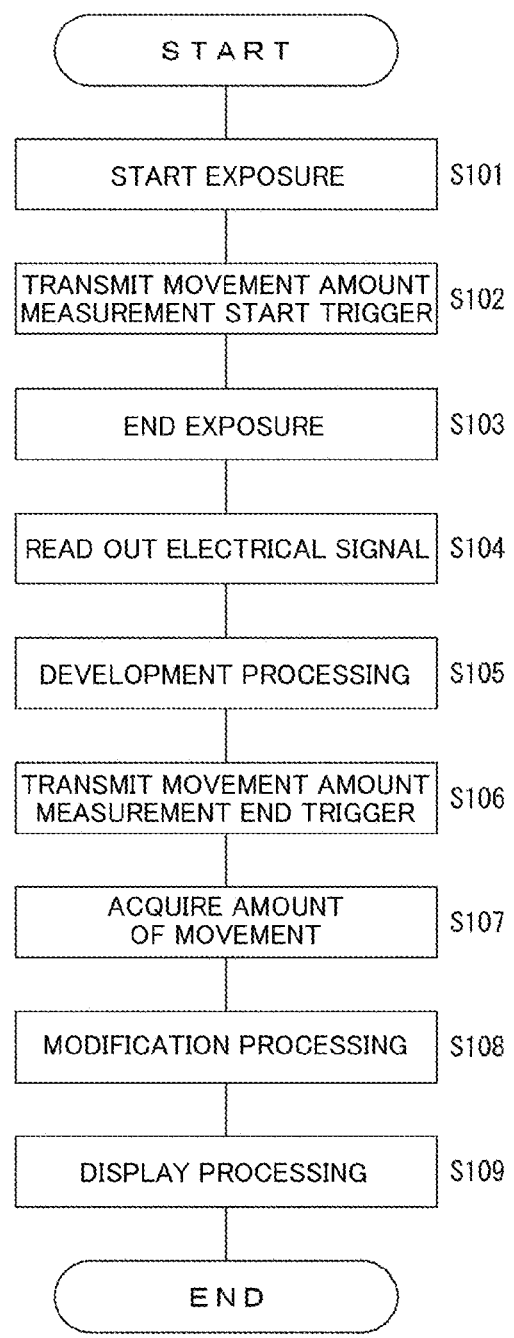
FIG. 30 is a flowchart of main processing.
Figure 31:
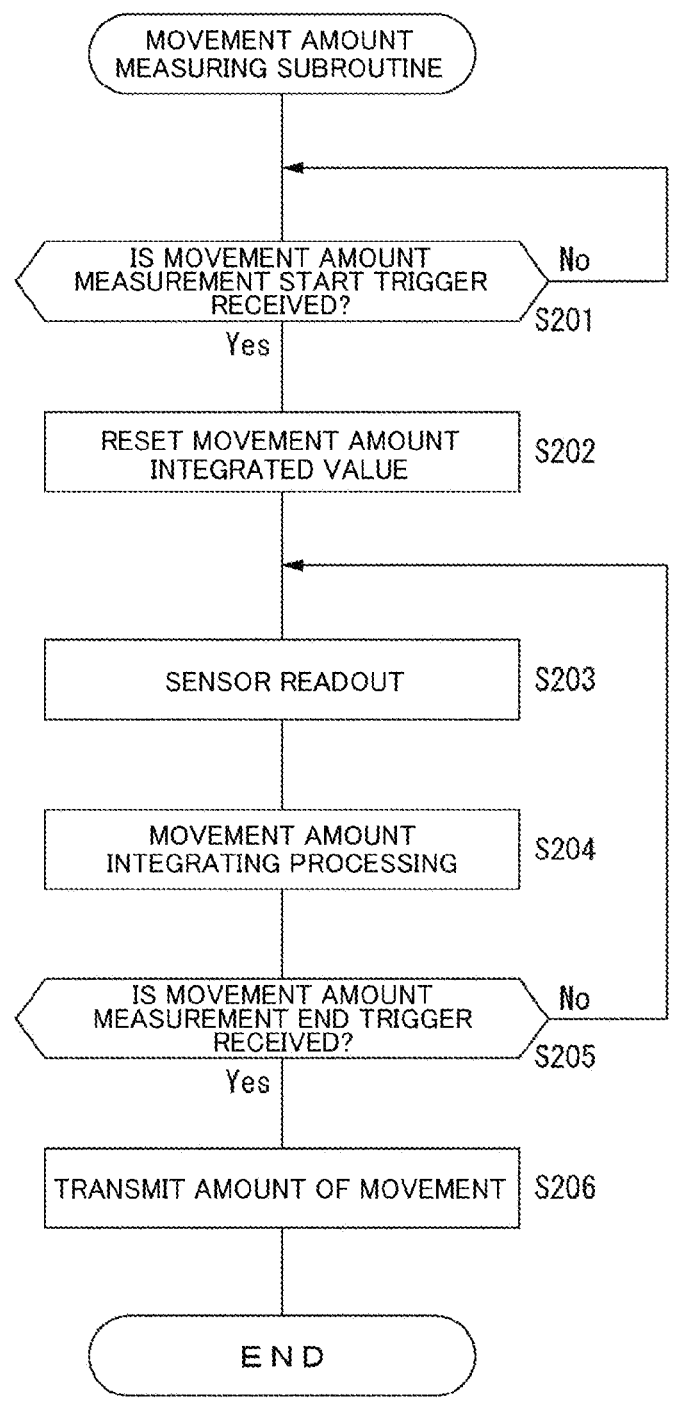
FIG. 31 is a flowchart of subroutine processing.

A series of processes is realized by, for example, main processing illustrated in FIG. 30 and subroutine processing illustrated in FIG. 31.

The signal processing unit 52 starts the exposure of each pixel of the imaging element 51a of the imaging element unit 51 by performing exposure start processing in step S101.

In step S102, the signal processing unit 52 transmits a movement amount measurement start trigger to the control unit 53. The control unit 53 that has received the trigger executes each processing of a movement amount measurement subroutine shown in FIG. 31. Details thereof will be described below.

The signal processing unit 52 ends the exposure of each pixel of the imaging element 51a by executing exposure end processing in step S103. A timing at which step S103 is executed is determined according to an elapsed time from execution of the processing of step S101. The elapsed time is determined according to various parameters such as an imaging mode or International Organization for Standardization (ISO) sensitivity.

The exposure time T4 illustrated in FIG. 3C is a time required from the execution of step S101 to the execution of step S103.

The signal processing unit 52 performs readout of an electrical signal in step S104. Specifically, this is processing of reading out an electrical signal obtained by photoelectric conversion for each pixel of the imaging element 51a.

The readout time T5 illustrated in FIG. 3C is a time required for execution of the processing of step S104.

The signal processing unit 52 executes development processing in step S105. The development processing is processing of performing various signal processing on the captured image data. The development time T6 illustrated in FIG. 3C is a time required for execution of the processing of step S105.

In step S106, the signal processing unit 52 transmits a movement amount measurement end trigger to the control unit 53. The control unit 53 that has received the trigger executes processing of transmitting an amount of movement (an amount of change) measured in the subroutine processing to the signal processing unit 52. Details thereof will be described below.

In step S107, the signal processing unit 52 executes processing of acquiring the amount of movement calculated by the control unit 53. In this example, although the signal processing unit 52 acquires the amount of movement when the control unit 53 performs transmission processing, the signal processing unit 52 may acquire the amount of movement by transmitting an acquisition request to the control unit 53.

The signal processing unit 52 executes the modification processing based on the acquired amount of movement in step S108. This modification processing is processing for generating various types of modified display image data described above. In addition to the modification processing in step S108, the signal processing unit 52 also performs correction processing for correcting distortion of the lens or the like.

In step S109, the signal processing unit 52 executes processing of displaying the modified display image data on the display unit.

Next, a subroutine for measuring the amount of movement of the imaging device 1 will be described with reference to FIG. 31.

The control unit 53 performs processing of determining whether or not the movement amount measurement start trigger has been received. The movement amount measurement start trigger is received from, for example, the signal processing unit 52.

When the movement amount measurement start trigger has not been received, the control unit 53 performs processing of step S201 again. Further, when the control unit 53 has determined that the movement amount measurement start trigger has been received, the control unit 53 proceeds to step S202 and subsequent steps.

Although FIG. 31 illustrates an example in which the processing of step S201 is repeatedly executed until the movement amount measurement start trigger is received, the imaging device 1 may be configured so that the subroutine is started when the movement amount measurement start trigger has been received and respective processing of step S202 and subsequent steps is executed.

The control unit 53 performs resetting of a movement amount integrated value in step S202. That is, an amount of movement of the imaging device 1 (or change in the posture) can be measured with reference to this point in time.

The control unit 53 acquires outputs of various sensors such as the acceleration sensor 60 and the angular velocity sensor 61 in step S203 and performs integrating processing to obtain the amount of movement in step S204.

Further, the control unit 53 confirms (determines) whether or not the movement amount measurement end trigger has been received from the signal processing unit 52 in step S204, and execute readout processing of step S203 and integration processing of step S204 again when the movement amount measurement end trigger has not been received.

The processes of steps S203 and S204 are repeatedly executed so that an appropriate movement amount integrated value according to the amount of movement or the posture change amount of the imaging device 1 is calculated for each frame.

When the control unit 53 determines in step S205 that the movement amount measurement end trigger has been received from the signal processing unit 52, the control unit 53 transmits the movement amount integrated value as the amount of movement to the signal processing unit 52 in step S206.

5. Display Position of Superimposed Display Image

For the display image data (or modified display image data) for displaying an image on each display unit in the imaging device 1, not only the captured image data but also data of images of various icons or the like (hereinafter referred to as "superimposed display images") is also used.

Figure 32:
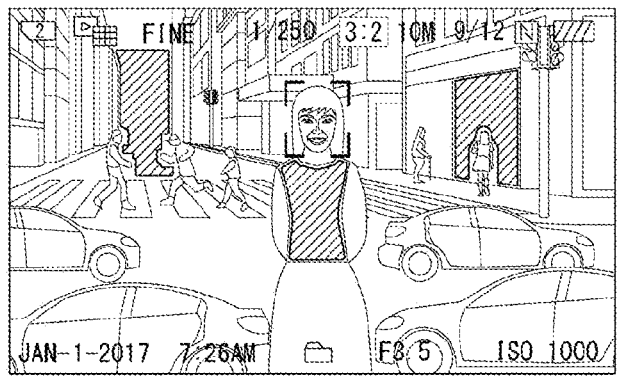
FIG. 32 is a diagram illustrating an example of display image data including a superimposed display image.

For example, the superimposed display image in the display image data shown in FIG. 32 is configured of various icons for a current date and time, a setting of the imaging device 1, a remaining battery level, and the like disposed along upper and lower ends, a face recognition mark indicating that the face of the subject is being recognized, a striped pattern (hatched area in FIG. 32) indicating an area in which the brightness value is equal to or greater than a set value, an autofocus mark (focus aiming), a target frame, or the like.

Figure 33:
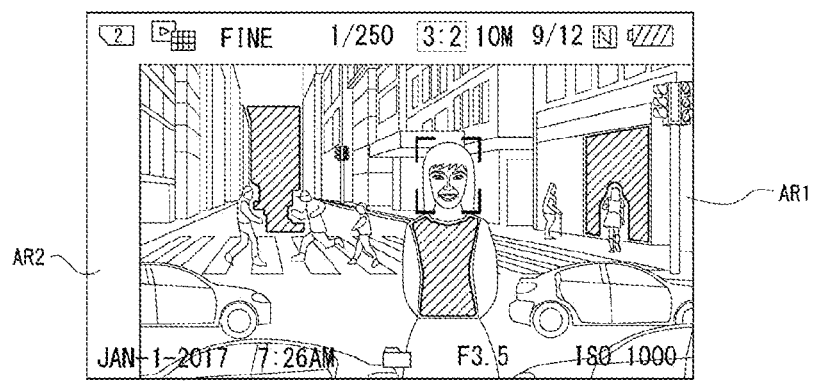
FIG. 33 is a diagram illustrating an example of modified display image data including a superimposed display image.

FIG. 33 illustrates an example of modified display image data generated so that the subject is shifted and displayed depending on the position or change of the imaging device 1. The modified display image data has a first area AR1 and a second area AR2.

The superimposed display image includes a first type superimposed display image SP1 in which the display position has been shifted according to the subject being shifted and displayed, and a second type superimposed display image SP2 in which the display position has been fixed regardless of the shift of the subject.

Specifically, the superimposed display image relevant to the position of the subject such as the remaining battery level or a shooting mode is the first type superimposed display image SP1, and the superimposed display image not relevant to the position of the subject is the second type superimposed display image SP2.

According to the examples of FIGS. 32 and 33, the face recognition mark, the focus mark, the striped pattern regarding a brightness value, or the like are the first type superimposed display image SP1. Further, icons for a current date and time, a setting of the imaging device 1, a remaining battery level, and the like are the second type superimposed display images SP2.

6. Selection of Modified Display Image Data and Non-Modified Display Image Data It is conceivable that the various modification processing described above be applied only depending on a specific situation. Specifically, the control unit 53 (or the signal processing unit 52) can select whether to perform output of the modified display image data subjected to the modification processing or to perform output of non-modified display image data not subjected to the modification processing depending on the shooting state. The control unit 53 (or the signal processing unit 52) functions as a display image data selection unit that selects either modified display image data or non-modified display image data.

The shooting state, for example, may differ from the shooting mode, may be the amount of motion of the imaging device 1 (an amount of movement or acceleration in each axial direction, angular velocity in an axial direction, or the like), or may be setting of an output destination of captured data.

For example, the modified display image data may be displayed on the display unit by performing the various modification processing described above at the time of monitoring the still image capturing. That is, the modified display image data may be selected as the display image data to be displayed on the display unit at the time of monitoring the still image capturing.

In still image capturing, the photographer may rotate the imaging device 1 by moving the imaging device 1 up, down, left and right while looking into the EVF monitor 7 of the imaging device 1 in order to find a shooting composition (angle of view). Further, when the subject is an animal or a person, it is conceivable to move the motion of the imaging device 1 rapidly not to miss a shooting timing.

In such a case, when a deviation between the motion of his or her face and the motion of the display image displayed on the visually recognized display unit occurs, visually induced motion sickness is likely to occur.

Therefore, it is possible to reduce or prevent the visually induced motion sickness by performing the above-described modification processing at the time of monitoring still image capturing.

It is effective to perform the above-described modification processing when the display unit visually recognized by the photographer is the EVF monitor 7 provided in the EVF 4. When the photographer is looking into the EVF monitor 7, the photographer is highly likely to move his/her face while visually recognizing only the display image displayed on the EVF monitor 7. In such a case, visually induced motion sickness is highly likely to be caused when the above-described deviation occurs, and thus, it is possible to reduce the visually induced motion sickness by causing the photographer to visually recognize the image in which the deviation has been reduced by displaying the modified display image data.

Further, in the display image data to be displayed on the rear monitor 5, normal display image data to which the modification processing is not applied may be displayed (selected) even when it can be inferred that it is the time of monitoring the still image capturing. In a situation in which the rear monitor 5 is visually recognized, it is highly likely for the photographer to directly visually recognize a surrounding background together with the rear monitor 5. In such a situation, since visually induced motion sickness is less likely to be caused by the display image data displayed on the rear monitor 5, the modification processing may not be performed.

Signal processing is applied to a wide range in the imaging element 51a at the time of monitoring of the still image capturing so that captured image data is generated, thereby increasing a likelihood of the second area AR2 being not generated even when the subject is shifted and displayed. Accordingly, it is possible to avoid degradation of visibility due to the second area AR2.

Further, a configuration may be made so that the above-described modification processing is not performed at the time of capturing a moving image. That is, non-modified display image data may be selected as display image data to be displayed on the display unit at the time of capturing a moving image.

It is conceivable to try to capture a moving image without blurring so that it is not difficult to see the moving image when a recorded moving image file is viewed later at the time of capturing a moving image. Therefore, since visually induced motion sickness is less likely to be caused by the modified display image data being not displayed, the modification processing may not be performed.

Further, there is also a request to ascertain an actually recorded angle of view at the time of capturing a moving image and thus, when the modified display image data is displayed, the angle of view of the actually recorded moving image does not match the angle of view displayed on the display unit, which may not be appropriate.

If the modified display image data is displayed when a moving subject is tracked while moving subject is kept in the angle of view, there is concern that a target subject is displayed off a center of the display unit, making tracking difficult.

The photographer may be able to select either the display image data on which the modification processing has not been performed or the modified display image data on which the modification processing has been performed, as the image to be displayed on the display unit.

It is conceivable to try to capture a moving image without blurring so that it is not difficult to see the moving image when a recorded moving image file is viewed later at the time of capturing a moving image. Therefore, since image sickness is less likely to be caused by the modified display image data being not displayed, the modification processing may not be performed.

Further, there is also a request to ascertain an actually recorded angle of view at the time of capturing a moving image and thus, when the modified display image data is displayed, the angle of view of the actually recorded moving image does not match the angle of view displayed on the display unit, which may not be appropriate.

If the modified display image data is displayed when a moving subject is tracked while moving subject is kept in the angle of view, there is concern that a target subject is displayed off a center of the display unit, making tracking difficult.

The photographer may be able to select either the display image data on which the modification processing has not been performed or the modified display image data on which the modification processing has been performed, as the image to be displayed on the display unit.

When the image captured by the imaging device 1 is displayed on a display unit (for example, a stationary external monitor) provided outside the imaging device 1 via an external output, normal display image data not subjected to the modification processing may be displayed (selected). When a viewer views the captured image through the display unit such as the external monitor, the motion of the imaging device 1 is not synchronized with a motion of a face of the viewer, and thus, there is concern that it becomes difficult to see the modified display image data when the modified display image data is displayed. In particular, when the second area AR2 becomes too wide, that is, when the first area AR1 becomes too narrow, there is high concern that it is difficult to see. In such a case, it is better to display the display image data to which the modification processing is not applied. Further, the display image data to be displayed on the display unit provided outside the imaging device 1 may be display image data to which various corrections for distortion due to the optical system or image stabilization has been applied.

It is preferable for a moving image file to be recorded to be data not subjected to the modification processing.

When a recorded moving image file is viewed, it is difficult for the face to move in synchronization with the motion of the imaging device 1 at the time of shooting, and thus, it is preferable to display normal display image data not subjected to the modification processing. Further, in order to make the moving image easier to see, image data separately subjected to processing such as image stabilization may be displayed.

A configuration for performing generation of the modified display image data subjected to the modification processing as described above can be applied not only to the imaging device 1 but also to a head mounted display (HDM) with a camera, or the like. For example, the configuration can also be applied to augmented reality (AR) in which an image such as landscape captured by a camera has been used. In the HDM, a wearer looks at only display image data displayed onto the HDM. In such a situation, when there is a discrepancy between a motion of a head of the wearer and a motion of a display image, a possibility of visually induced motion sickness being caused is high, and thus, it is useful to display the modified display image data.

An image to be displayed on an HMD worn by a medical staff when a medical action is performed through a remote operation is also set as modified display image data, such that a deviation between a position of a treatment target part in a patient and a displayed image is reduced, making it possible to prevent treatment mistake due to a display delay.

7. Modification Examples

Some examples of display delay time will be described.

In the description of FIG. 3C, the sum of the exposure time T4, the readout time T5, the development time T6, and the display time T7 has been described as the display delay time (example 1 of the display delay time).

Light exposed by the imaging element 51a during the exposure time T4 includes light reflected from the subject captured at an angle of view at a point in time of exposure start or light reflected from the subject captured at an angle of view immediately before exposure end. That is, when the subject has moved during the exposure time T4, the same subject has an influence on a plurality of pixels.

Considering this, when the display delay time is considered for the pixels on which the subject light has an influence at the last moment in the exposure time T4, the readout time T5, the development time T6, and the display time T7 may be considered (example 2 of display delay time).

Further, when the display delay time is considered for an average pixel position of the subject in the exposure time T4, a delay time from a point in time when half of the exposure time T4 has elapsed may be considered, and thus, 50% of the exposure time T4, the readout time T5, the development time T6, and the display time T7 may be considered (example 3 of the display delay time).

Figure 34:
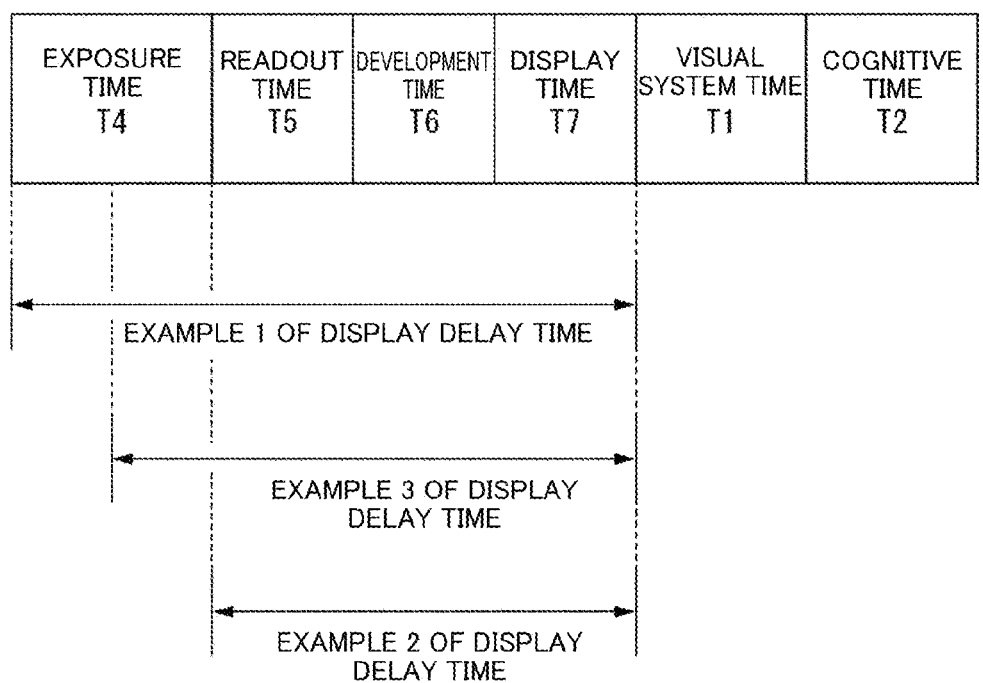
FIG. 34 is a diagram illustrating a variation in display delay time.

That is, the display delay time may be a sum of T4, T5, T6, and T7, may be a sum of half of T4, T5, T6, and T7, or may be a sum of T5, T6, and T7 (see FIG. 34).

The display delay time may be measured by the imaging device 1 or may be calculated on the basis of a setting of the shooting mode or the like. When the display delay time is calculated according to various settings, the display delay time may be acquired by referring to, for example, a table indicating a correspondence between the settings and the display delay time.

8. Conclusion

As described in each of the above-described examples, the imaging device 1 (the imaging device 1A) according to the present technology includes the imaging element 51a (the sub-imaging device 51Aa), the delay time acquisition unit (the signal processing unit 52) that acquires the display delay time of the captured image based on the exposure time T4 of the imaging element 51a (the sub-imaging element 51Aa) and the development processing time (the development time T6) required for development processing, and the image data generation unit (the signal processing unit 52) that generates the modified display image data in which the image display delay due to the display delay time has been reduced using an amount of change (amount of movement) in the position or posture of the imaging device body during the display delay time.

The modified display image data in which the image display delay has been reduced is, for example, display image data shifted in an up and down direction and a left and right direction when the captured image data captured by the imaging element 51a is converted into display image data for display on the display unit (EVF monitor 7 or the like). Alternatively, this is display image data that has been enlarged or reduced.

It is possible to perform an image display with a small delay with respect to the motion of the imaging device 1 (or an image display in which a delay is canceled to some extent) by generating the modified display image data in consideration of not only a time required for exposure but also a time required for development processing. Accordingly, the photographer can visually recognize the display image with a low sense of discomfort with respect to the motion of the imaging device 1.

The imaging device 1 may include the display unit (the EVF monitor 7 or the like) on which the modified display image data is displayed, as described in the configuration of the imaging device 1.

The display unit is, for example, the EVF monitor 7 provided inside an electronic viewfinder (EVF) or the rear monitor 5 attached to a back surface of the imaging device.

By the modified display image based on the modified display image data being displayed on the display unit of the imaging device 1, the photographer himself or herself can visually recognize the modified display image following the motion of the photographer holding the imaging device 1. That is, since it is possible to visually recognize the modified display image that matches the motion of the photographer, it is possible to reduce the visually induced motion sickness of the photographer.

As described in the configuration of the imaging device 1, the display unit (the EVF monitor 7) may be provided in the electronic viewfinder (the EVF 4).

An enclosure 8 that covers the EVF monitor 7 may be provided around in the EVF 4.

When the photographer has performed shooting while looking into such an EVF monitor 7, the photographer can be in a state in which the photographer can visually recognize only the display image displayed on the EVF monitor 7. That is, a display image displayed on the rear monitor 5 together with a directly visible surrounding landscape is visually recognized in the rear monitor 5, whereas the surrounding landscape cannot directly visually recognized and only the display image is visually recognized in the EVF monitor 7.

In such a situation, since the motion of the imaging device 1 is substantially synchronized with the motion of the face of the photographer, it is easy for visually induced motion sickness to occur when the motion of the imaging device 1 does not match the motion of the display image of the EVF monitor 7. According to this configuration, the modified display image data in which the image display delay due to the display delay time has been reduced is generated and displayed on the EVF monitor 7 so that the photographer visually recognizes the display image following the motion of the face, making it possible to reduce a likelihood of visually induced motion sickness occurring.

As described in each example of the generation of the modified display image data, the image data generation unit (the signal processing unit 52) may perform the modification processing for generating the modified display image data so that the display position of the subject on the display unit is shifted, as compared with the case in which the modification processing is not performed.

By performing the modification processing so that the display position of the subject is shifted as compared with the case in which the modification processing is not performed, the modified display image data can be generated and the display following the motion of the imaging device 1 can be performed.

Accordingly, since the motion of the imaging device 1 and the motion of the display image are easily synchronized, it is possible to reduce the occurrence of visually induced motion sickness.

As described in the example of the selection of the modified display image data and the non-modified display image data, the image data generation unit (the signal processing unit 52) may generate the non-modified display image data in which the image display delay due to the display delay time is not reduced, and display image data transmitted to the display unit external to the imaging device 1 may be the non-modified display image data.

The display unit external to the imaging device 1 is, for example, a stationary television receiver, a liquid crystal display device, or a portable smartphone.

That is, this case is, for example, a case in which display image data to be visually recognized by a user who is not synchronized with the motion of the imaging device 1 may be generated. When the display image data is generated from the captured image data captured by the imaging device 1 to cause such a user to view the image, non-modified display image data rather than the modified display image data in which the image display delay due to the display delay time is reduced is generated. It is not necessary to generate the modified display image data because visually induced motion sickness caused by showing the display image that does not match the motion of the imaging device 1 does not occur for the user who is not synchronized with the motion of the imaging device 1.

The non-modified display image data is display image data on which modification for reducing the image display delay due to the display delay time has not been performed, and does not mean display image data that has not been corrected at all. That is, the non-modified display image data may be display image data on which correction for smoothing up/down/left/right motion so that it is easy to see (for example, correction for removing high frequency components), or other corrections for ensuring the easy visibility of the display image has been performed. Of course, the distortion caused by the lens may be corrected.

As described in the example of the selection of the modified display image data and the non-modified display image data, the image data generation unit (the signal processing unit 52) may include a display image data selection unit (the control unit 53 or the signal processing unit 52) that generates the non-modified display image data in which the image display delay due to the display delay time is not reduced, and selects either modified display image data or non-modified display image data as display image data to be displayed on the display unit according to the shooting state.

The shooting state is, for example, a still image capturing mode or a moving image capturing mode (that is, a type of shooting mode). Alternatively, the shooting state may be an amount of movement, acceleration, or angular velocity of the imaging device in an up and down direction and a left and right direction. Further, the shooting state may be an output destination of the display image data.

The modified display image data is display image data modified so that visually induced motion sickness is prevented even when a photographer performing shooting while moving his/her face visually recognizes the display image data. However, there is concern that an image size is reduced, as described above. On the other hand, the non-modified display image data is, for example, display image data to which correction has been applied so that a user not synchronized with the motion of the imaging device 1 visually recognizes the display image data. It is easy for the user not synchronized with the motion of the imaging device 1 to visually recognize such non-modified display image data. Further, the image size does not become small.

It is possible to display a display image appropriate for a situation by the imaging device 1 including the control unit 53 (or the signal processing unit 52) serving as a display image data selection unit that selects either modified display image data or non-modified display image data.

As described in the example of the selection of the modified display image data and the non-modified display image data, the display image data selection unit (the signal processing unit 52 or the control unit 53) may select the non-modified display image data when a mode for shooting a moving image is selected as a shooting state.

In the moving image capturing mode, it is conceivable for the photographer to curb an amount of movement or acceleration change per unit time of the imaging device 1 in an up and down direction and a left and right direction in order to capture a moving image that is easy to see.

Since the captured image data captured in such a situation is highly likely to be stable and visually induced motion sickness is less likely to occur, the non-modified display image data is selected and displayed on the display unit instead of the modified display image data. Since there is concern that the modified display image data has a narrow display area as described above, selecting the non-modified display image data makes it possible to cause the user to see a display image in which a wide range is captured.

Further, in the moving image capturing mode, since there is a request of the photographer who wants to confirm a recorded image itself on the display unit, the request can be met by selecting the non-modified display image data.

As described in the example of the selection of the modified display image data and the non-modified display image data, the display image data selection unit (the signal processing unit 52 or the control unit 53) selects the modified display image data when a mode for capturing a still image is selected as the shooting state.

In the still image capturing mode, it is conceivable that the photographer determine an angle of view so that a subject desired to be shot is in a disposition desired to be shot, and move the imaging device 1 to fit in the angle of view. Further, in such a case, it is conceivable to move the imaging device 1 rapidly not to miss a best shooting timing considered by the photographer.

That is, in such a situation, for example, the display image data displayed on the EVF monitor 7 is highly likely to cause visually induced motion sickness. Since the display image data selection unit selects the modified display image data when the still image capturing mode is selected, the photographer visually recognizes the display image based on the modified display image data in which the image display delay has been reduced, thereby curbing the visually induced motion sickness.

As described in the fifth example of the modified display image data, the image data generation unit (the signal processing unit 52) generates the modified display image data on the basis of the information on the incidence optical system (the optical system 50) for the imaging element 51a.

The information on the incidence optical system for the imaging element 51a is, for example, information on a type of lens such as a telephoto lens or a wide-angle lens, or a setting value of an aperture.

For example, a range (angle of view) imaged by the imaging element 51a differs between the telephoto lens and the wide-angle lens. Therefore, since an amount of movement (difference amount) of a projection position of the subject on the imaging element 51a when the imaging device 1 is moved also differs, an amount of shift for generating the modified display image data also differs. Since it is possible to perform an image display matching the motion of the imaging device 1 by generating the modified display image data using the information on the incidence optical system, it is possible to further enhance an effect of reducing visually induced motion sickness.

As described in the first example of the modified display image data, the image data generation unit (the signal processing unit 52) may use pixel data having specific brightness for the area of the modified display image data not captured by the imaging element 51a.

Pixels of the display image displayed on the basis of the modified display image data may include pixels (the first area AR1 described above) in which the captured image data in the cropping range of the imaging element 51a is displayed, pixels in which the captured image data outside the cropping range of the imaging element 51a is displayed, and pixels outside the range of the imaging element 51a, that is, pixels in which an image in a range not captured by the imaging element 51a is to be displayed.

According to the present configuration, pixel data having specific brightness is used at least for the area not imaged by the imaging element 51a. The specific pixel data is, for example, a black pixel, a white pixel, or a pixel pattern (a striped pattern or the like) repeated for each specific pixel.

Accordingly, it is possible to perform an image display matching the motion of the imaging device 1 while displaying any image on each pixel in the display unit.

As described in the second example of the modified display image data, the image data generation unit (the signal processing unit 52) may use the captured image data outside the cropping range for the modified display image data.

The captured image data in the cropping range refers to an area cropped as a range of lens distortion pixels or pixels effective in processing such as image stabilization in the entire pixel area exposed to the subject light by the imaging element 51a. That is, the captured image data outside the cropping range refers to an area (an unused area) other than the area cropped as the range of lens distortion pixels or pixels effective in processing such as image stabilization.

According to the present configuration, it is possible to narrow an area in which the pixel data with specific brightness is used, for example, by using the captured image data outside the cropping range for a part of the modified display image data, and to generate the modified display image data without a sense of discomfort. That is, it is possible to generate modified display image data in which the modification processing is inconspicuous.

The captured image data outside the cropping range may be used for all the second area AR2 generated by the shift of the display image data so that pixels having specific brightness (for example, black pixels) do not have to be used.

As described in the sixth example of the modified display image data, a second imaging element (the sub-imaging element 51Aa) that generates the second imaging element data based on the incident light incident through a second incidence optical system (the sub-optical system 50A) is included, and the image data generation unit (the signal processing unit 52) may use a second captured image data for an area of the modified display image data not captured by the imaging element 51a.

For example, a sub-imaging device (the sub-imaging unit 9) including the second incidence optical system (the sub-optical system 50A) and the second imaging element (the sub-imaging element 51Aa) is included.

It is possible to generate modified display image data with an extremely low sense of discomfort by using data captured by the sub-imaging device (the sub-imaging unit 9) for the area not imaged by the imaging element 51a in the modified display image data. Accordingly, it is possible to make it difficult for visually induced motion sickness to occur and to reduce the display area in which pixel data having specific brightness is used.

For example, a sub-imaging device (the sub-imaging unit 9) including the second incidence optical system (the sub-optical system 50A) and the second imaging element (the sub-imaging element 51Aa) is included.

It is possible to generate modified display image data with an extremely low sense of discomfort by using data captured by the sub-imaging device (the sub-imaging unit 9) for the area not imaged by the imaging element 51a in the modified display image data. Accordingly, it is possible to make it difficult for image sickness to occur and to reduce the display area in which pixel data having specific brightness is used.

It is preferable for the sub-imaging device (the sub-imaging unit 9) to have a wider angle than a range imaged by the main imaging element 51a of the present imaging device 1. Accordingly, the area not imaged by the imaging element 51a can be appropriately filled on the basis of the captured image data captured by the second imaging element (the sub-imaging element 51Aa) of the sub-imaging element (the sub-imaging element 9).

Further, since the captured image data captured by the second imaging element (the sub-imaging element 51Aa) is used at the edge in the display area of the display unit, the resolution may be low. Even when the captured image data captured by the second imaging element (the sub-imaging element 51Aa) has a low resolution, it is difficult for the photographer to feel a sense of discomfort in the display image since the captured image data is used only for a part of an area between several frames.

As described in the seventh example of the modified display image data, the image data generation unit (the signal processing unit 52) may use the captured image data in the cropping range for the area of the modified display image data not captured by the imaging element 51a.

That is, the modified display image data is generated using the captured image data in the cropping range.

For example, the captured image data in the cropping range displayed in the first area AR1 is folded back to the second area AR2 side to be line-symmetrical about a boundary line between the first area AR1 and the second area AR2, and displayed. Accordingly, it is possible to generate modified display image data that is more comfortable than filling the second area AR2 with, for example, a black image.

As described in the chapter regarding the display position of the superimposed display image, the image data generation unit (the signal processing unit 52) may determine the superimposition position according to the amount of shift of the subject for at least a part of the superimposed display image (the first type superimposed display image SP1) that is superimposed and displayed on the captured image data.

Further, the superimposed display image (the first type superimposed display image SP1 and the second type superimposed display image SP2) is an icon image for indicating the shooting mode, a display icon indicating a remaining number of shots, an image icon indicating a battery charge amount, an icon indicating a position of a focus aiming, an image icon indicating a position of a face of a recognized person, and the like. Alternatively, a histogram indicating a brightness distribution, for example, is also included in the superimposed display image.

Since there is no deviation between the display image actually displayed on the display unit and, for example, a superimposed display image indicating a specific area (or position) on the image when a part of the superimposed display image is shifted in the same manner according to the amount of shift calculated in processing of generating the modified display image data and displayed, it is possible to perform an image display appropriate for the user or the photographer.

As described in the chapter regarding the display position of the superimposed display image, the image data generation unit (the signal processing unit 52) may determine the superimposition position according to the amount of shift with respect to a focus aiming serving as the superimposed display image (a rectangular dotted line for indicating the imaging area IA in FIG. 18).

For example, the focus aiming is a superimposed display image indicating a specific position on the image.

When the position of the subject on the display unit is shifted and displayed, the focus aiming can similarly be shifted and displayed so that a correct aiming position can be indicated.

As described in the third example of the modified display image data, an area in which the captured image is displayed on the display area of the display unit may be smaller than the display area.

For example, a display image according to the captured image data is displayed in a part (for example, a part around a central part) of the entire display area of the display unit.

Accordingly, even when an area in which the captured image data is displayed in the modified display image data is offset in any direction with respect to a central portion, an area in which the captured image data is displayed is easily fitted in the entire display area of the display unit, and thus, it is possible to present a display image in which a sufficient range is shown, to the photographer or the user. Further, the photographer can ascertain a width of the angle of view of the captured image since a part of the captured image data does not be out of the display area.

As described in the fourth example of the modified display image data, the image data generation unit (the signal processing unit 52) may perform generation of the display image data on which the guide frame indicating an output area has been superimposed.

The guide frame indicating the output area is, for example, a guide frame indicating a recorded area.

For example, when the area in which the captured image data is displayed is offset in any direction with respect to the central portion, the photographer is unlikely to be able to ascertain which area is currently recorded. Superimposing and displaying the guide frame enables the photographer to ascertain the currently recorded area and perform appropriate shooting.

The effects described in the present specification are merely examples and are not limited, and other effects may be obtained.

9. Application Example 1

The technology according to the present disclosure can be applied to various products. For example, the technology according to the present disclosure may be applied to an operating room system.

Figure 35:
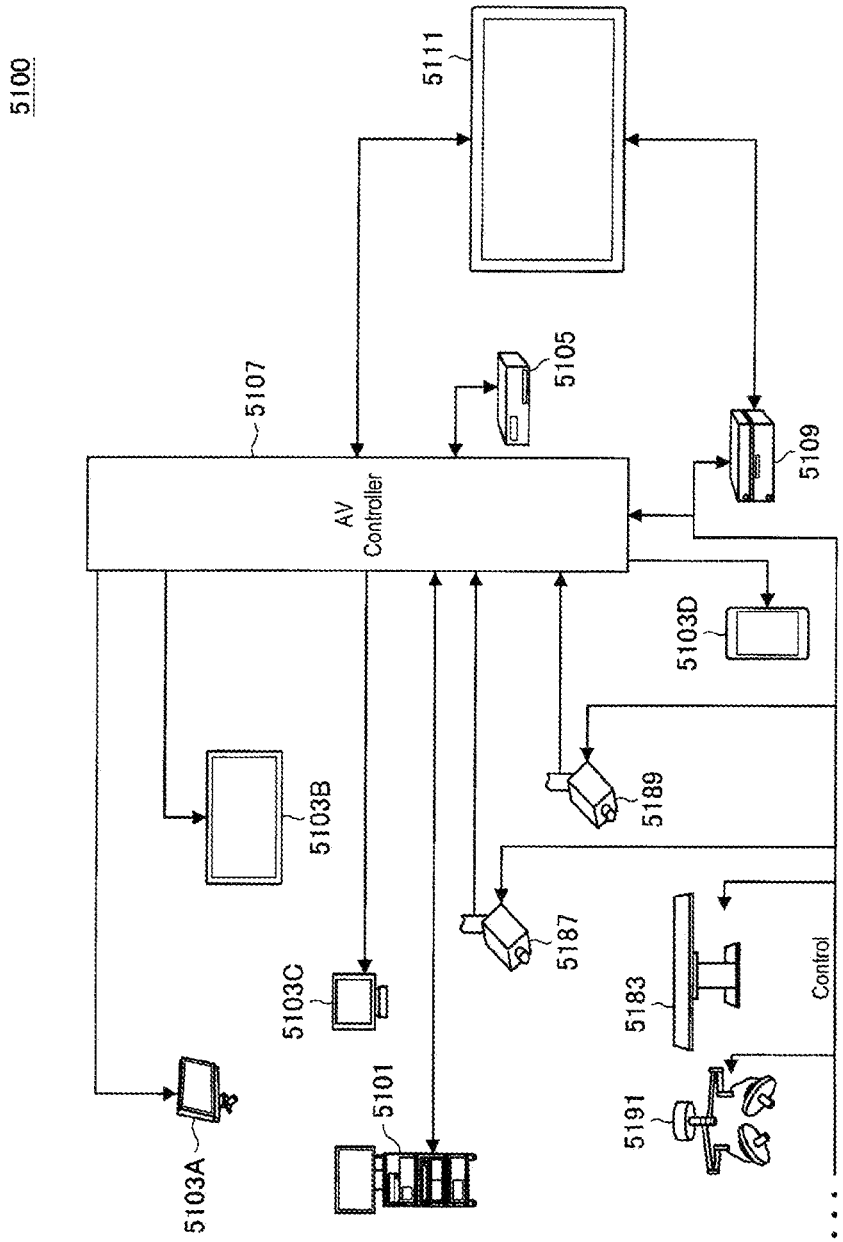
FIG. 35 is a diagram schematically illustrating an overall configuration of an operating room system.

FIG. 35 is a diagram schematically illustrating an overall configuration of an operating room system 5100 to which the technology according to the present disclosure can be applied. Referring to FIG. 35, the operating room system 5100 is configured by connecting a group of devices installed in an operating room so that these can cooperate with each other via an audiovisual controller (AV Controller) 5107 and an operating room control device 5109.

Various devices can be installed in the operating room. In FIG. 35, as an example, various device groups 5101 for endoscopic surgery, a ceiling camera 5187 provided on a ceiling of the operating room to image hands of the surgeon, an operating room camera 5189 provided on the ceiling of the operating room to image a state of the entire operating room, a plurality of display devices 5103A to 5103D, a recorder 5105, a patient bed 5183, and an illumination 5191 are illustrated.

Here, among these devices, the device group 5101 belongs to the endoscopic surgery system 5113, which will be described below, and includes an endoscope, a display device that displays an image captured by the endoscope, and the like. Each device belonging to the endoscopic surgery system 5113 is also referred to as a medical device. On the other hand, the display devices 5103A to 5103D, the recorder 5105, the patient bed 5183, and the illumination 5191 are devices provided in the operating room, for example, separately from the endoscopic surgery system 5113. Each of these devices that does not belong to the endoscopic surgery system 5113 is also referred to as a non-medical device. The audiovisual controller 5107 and/or the operating room control device 5109 controls operations of the medical devices and non-medical devices in cooperation with each other.

The audiovisual controller 5107 comprehensively controls processing regarding an image display in medical devices and non-medical devices. Specifically, the device group 5101, the ceiling camera 5187, and the operating room camera 5189 among the devices included in the operating room system 5100 can be devices (hereinafter also referred to as source devices) having a function of transmitting information to be displayed during surgery (hereinafter also referred to as display information). Further, the display devices 5103A to 5103D may be devices that output display information (hereinafter also referred to as output destination devices). Further, the recorder 5105 may be a device corresponding to both the source device and the output destination device. The audiovisual controller 5107 has a function of controlling the operation of the source device and the output destination device to acquire display information from the source device, and transmitting the display information to the output destination device for display or recording. The display information includes various images captured during the surgery, various types of information on the surgery (for example, physical information of patients, past examination results, information on a surgical procedure), and the like.

Specifically, information on an image of a surgical site in a body cavity of the patient captured by the endoscope can be transmitted as display information from the device group 5101 to the audiovisual controller 5107. Further, the ceiling camera 5187 may transmit information on an image at the hands of the surgeon captured by the ceiling camera 5187 as display information. Further, the operating room camera 5189 may transmit information on an image showing a state of the entire operating room captured by the operating room camera 5189 as display information. When the operating room system 5100 includes another device having an imaging function, the audiovisual controller 5107 may acquire information on an image captured by the other device as display information from the other device.

Alternatively, for example, information on these images captured in the past is recorded on the recorder 5105 by the audiovisual controller 5107. The audiovisual controller 5107 can acquire information on the images captured in the past as display information from the recorder 5105. Various types of information on the surgery may be recorded in the recorder 5105 in advance.

The audiovisual controller 5107 causes at least one of the display devices 5103A to 5103D, which is the output destination device, to display the acquired display information (that is, an image captured during the surgery or various types of information regarding the surgery). In the illustrated example, the display device 5103A is a display device suspended and installed from a ceiling of the operating room, the display device 5103B is a display device installed on a wall surface of the operating room, the display device 5103C is a display device installed on a desk in the operating room, and the display device 5103D is a mobile device having a display function (for example, a tablet personal computer (PC)).

Further, although not illustrated in FIG. 35, the operating room system 5100 may include devices outside the operating room. The devices outside the operating room may be, for example, a server connected to a network constructed inside or outside a hospital, a PC used by medical staff, and a projector installed in a conference room of the hospital. When such an external device is outside the hospital, the audiovisual controller 5107 can also display the display information on a display device of another hospital via a video conferencing system or the like for telemedicine.

The operating room control device 5109 comprehensively controls processing other than processing regarding an image display in a non-medical device. For example, the operating room control device 5109 controls drive of the patient bed 5183, the ceiling camera 5187, the operating room camera 5189, and the illumination 5191.

The operating room system 5100 is provided with a centralized operation panel 5111, and the user can give an instruction for an image display to the audiovisual controller 5107 via the centralized operation panel 5111 or give an instruction for an operation of the non-medical devices to the operating room control device 5109. The centralized operation panel 5111 includes a touch panel provided on a display surface of the display device.

Figure 36:
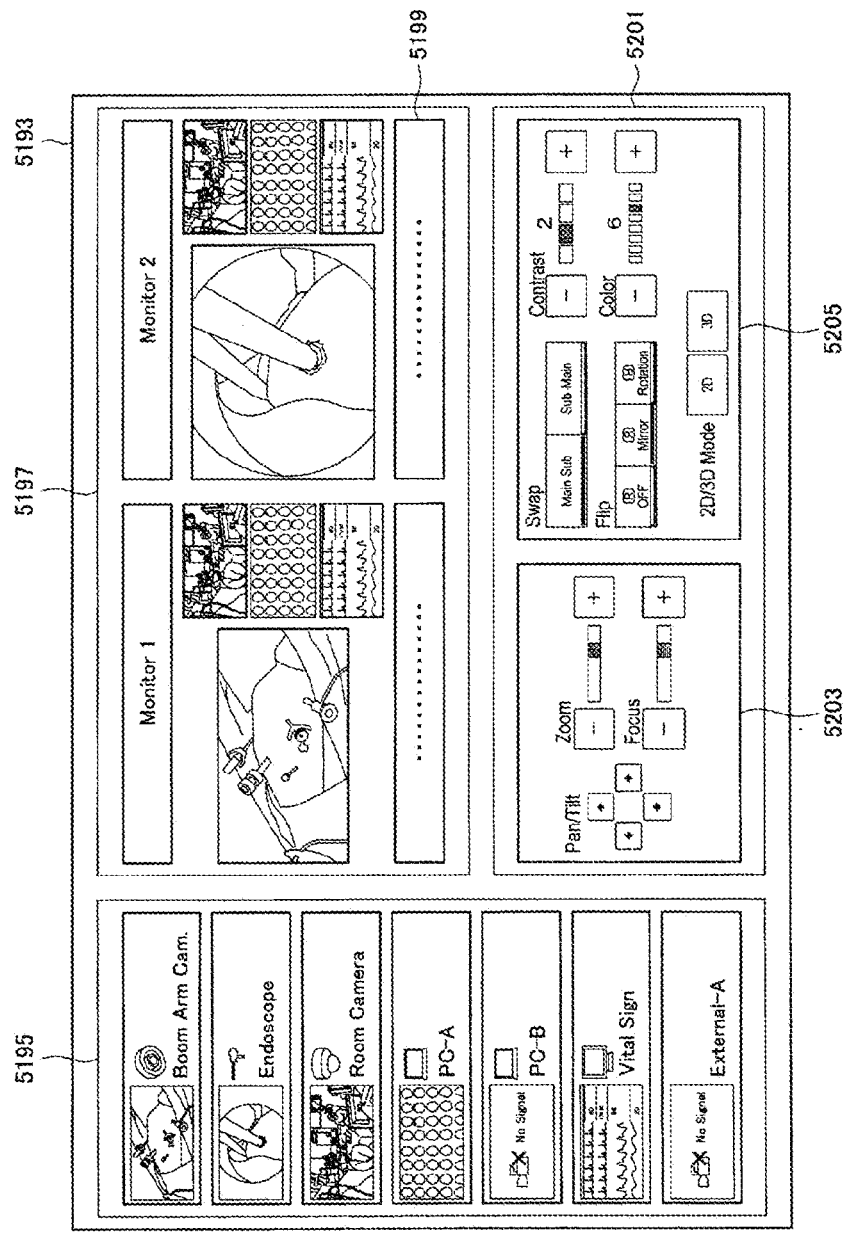
FIG. 36 is a diagram illustrating a display example of an operation screen on a centralized operation panel.

FIG. 36 is a diagram illustrating a display example of an operation screen in the centralized operation panel 5111. In FIG. 36, as an example, an operation screen corresponding to a case in which the operating room system 5100 is provided with two display devices as output destination devices is shown. Referring to FIG. 36, the operation screen 5193 is provided with a source selection area 5195, a preview area 5197, and a control area 5201.

In the source selection area 5195, a source device included in the operating room system 5100 and a thumbnail screen showing display information possessed by the source device are linked and displayed. The user can select the display information desired to be displayed on the display device from any one of the source devices displayed in the source selection area 5195.

A preview of screens displayed on two display devices (Monitor 1 and Monitor 2), which are output destination devices, is displayed in the preview area 5197. In the illustrated example, four images are displayed in PinP on one display device. The four images correspond to the display information transmitted from the source device selected in the source selection area 5195. One of the four images is displayed relatively large as a main image and the remaining three images are displayed relatively small as a sub-image. The user can switch between the main image and the sub-image by appropriately selecting the area in which the four images have been displayed. Further, a status display area 5199 is provided below the area in which the four images are displayed, and a status regarding the surgery (for example, an elapsed time of the surgery, and physical information of a patient) is appropriately displayed in the area.

The control area 5201 is provided with a source operation area 5203 in which graphical user interface (GUI) components for performing an operation with respect to the source device are displayed, and an output destination operation area 5205 in which GUI components for performing an operation with respect to the output destination device are displayed. In the illustrated example, the source operation area 5203 is provided with GUI components for performing various operations (pan, tilt, and zoom) with respect to a camera in the source device having an imaging function. The user can operate an operation of the camera in the source device by appropriately selecting these GUI components. Although not illustrated, when the source device selected in the source selection area 5195 is a recorder (that is, when an image recorded on the recorder in the past is displayed in the preview area 5197), the source operation area 5203 may be provided with a GUI component for performing operations such as playing, stopping, rewinding, and fast-forwarding the image.

Further, the output destination operation area 5205 is provided with GUI components for performing various operations (swap, flip, color adjustment, contrast adjustment, switching between a 2D display and a 3D display) with respect to a display on the display device, which is an output destination device. The user can operate the display on the display device by appropriately selecting these GUI components.

The operation screen displayed on the centralized operation panel 5111 is not limited to the illustrated example, and the user may be able to perform operational inputs to each device that can be controlled by the audiovisual controller 5107 and the operating room control device 5109 included in the operating room system 5100 via the centralized operation panel 5111.

Figure 37:
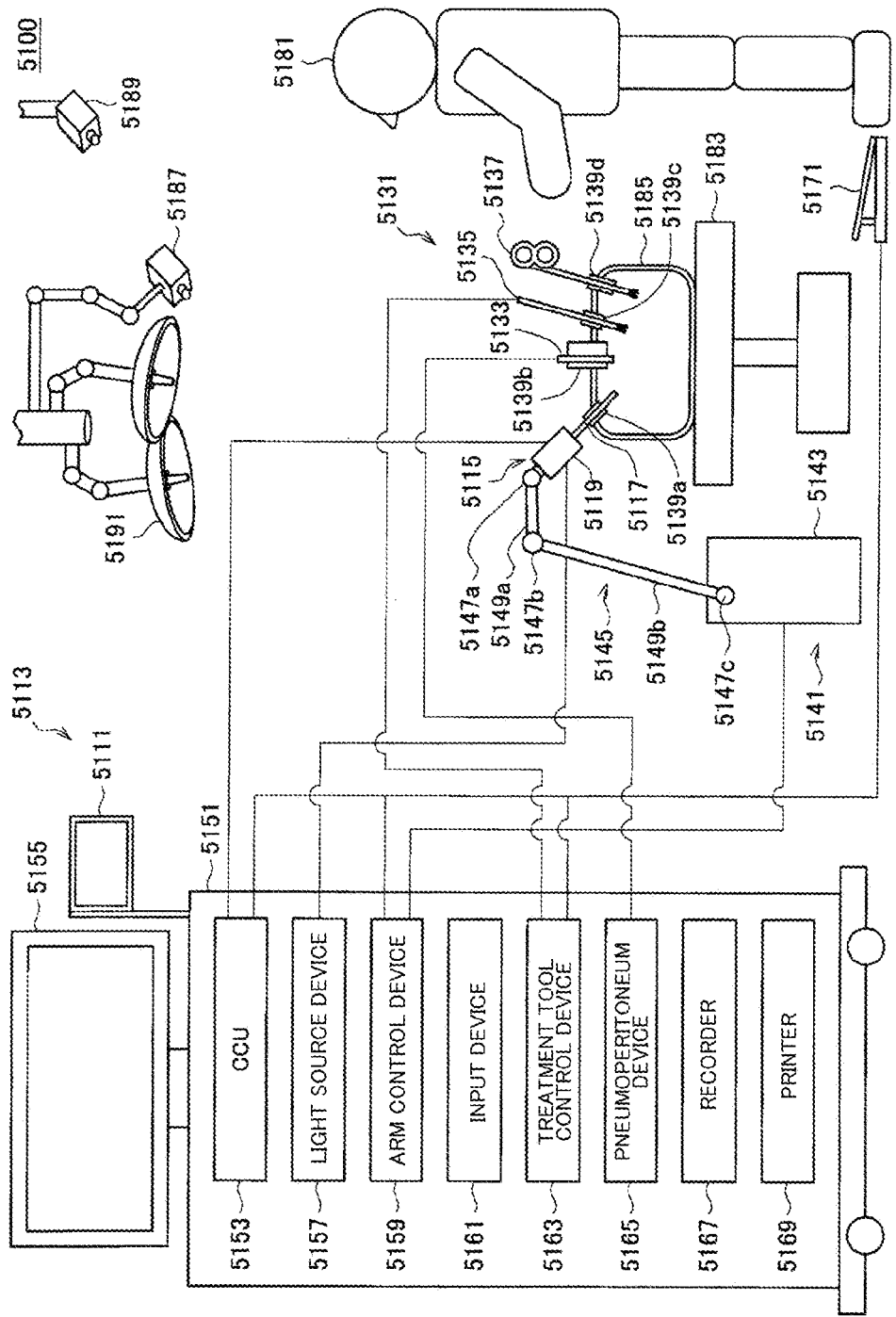
FIG. 37 is a diagram illustrating an example of a state of surgery in which an operating room system is applied.

FIG. 37 is a diagram illustrating an example of a state of the surgery in which the operating room system described above is applied. The ceiling camera 5187 and the operating room camera 5189 are provided on the ceiling of the operating room, and can shoot hands of a surgeon (doctor) 5181 who treats an affected part of a patient 5185 on the patient bed 5183 and a state of the entire operating room. The ceiling camera 5187 and the operating room camera 5189 may be provided with a magnification adjustment function, a focal length adjustment function, a shooting direction adjustment function, and the like. The illumination 5191 is provided on the ceiling of the operating room and irradiates at least the hands of the surgeon 5181. In the illumination 5191, an amount of irradiation light, a wavelength (color) of the irradiation light, an irradiation direction of the light, and the like may be appropriately adjusted.

The endoscopic surgery system 5113, the patient bed 5183, the ceiling camera 5187, the operating room camera 5189, and the illumination 5191 are connected so that these can cooperate with each other via the audiovisual controller 5107 and the operating room control device 5109 (not illustrated in FIG. 37), as illustrated in FIG. 35. The centralized operation panel 5111 is provided in the operating room, and the user can appropriately operate these devices present in the operating room through the centralized operation panel 5111, as described above.

Hereinafter, a configuration of the endoscopic surgery system 5113 will be described in detail. As illustrated, the endoscopic surgery system 5113 includes an endoscope 5115, other surgical tools 5131, a support arm device 5141 that supports the endoscope 5115, and a cart 5151 in which various devices for endoscopic surgery have been mounted.

In the endoscopic surgery, a plurality of tubular laparotomy tools called torrocas 5139*a* to 5139*d* are punctured into an abdominal wall instead of the abdominal wall being cut and the abdomen being opened. A lens barrel 5117 of the endoscope 5115 or other surgical tools 5131 are inserted into the body cavity of the patient 5185 from the torrocas 5139*a* to 5139d. In the illustrated example, a pneumoperitoneum tube 5133, an energy treatment tool 5135, and forceps 5137 are inserted into the body cavity of the patient 5185 as the other surgical tools 5131. Further, the energy treatment tool 5135 is a treatment tool that, for example, cuts and peels tissue, seals blood vessels using a high-frequency current or ultrasonic vibration. However, the illustrated surgical tools 5131 are merely examples, and various surgical tools generally used in endoscopic surgery such as forceps and a retractor may be used as the surgical tools 5131.

The image of the surgical site in the body cavity of the patient 5185 captured by the endoscope 5115 is displayed on the display device 5155. The surgeon 5181 performs a procedure, such as excising the affected part, using the energy treatment tool 5135 or the forceps 5137 while viewing the image of the surgical site displayed on the display device 5155 in real time. Although not illustrated, the pneumoperitoneum tube 5133, the energy treatment tool 5135, and the forceps 5137 are supported by the surgeon 5181 or an assistant during the surgery.

(Support Arm Device)

The support arm device 5141 includes an arm portion 5145 extending from the base portion 5143. In the illustrated example, the arm portion 5145 is configured of joint portions 5147a, 5147b, and 5147c, and links 5149a and 5149b, and is driven by control from the arm control device 5159. The endoscope 5115 is supported by the arm portion 5145, and a position and posture thereof are controlled. Thereby, stable fixing of the position of the endoscope 5115 can be realized.

(Endoscope)

The endoscope 5115 is configured of a lens barrel 5117 of which an area having a predetermined length from a tip is inserted into the body cavity of the patient 5185, and a camera head 5119 connected to a base end of the lens barrel 5117. Although the endoscope 5115 configured as a so-called rigid mirror having the rigid lens barrel 5117 is illustrated in the illustrated example, the endoscope 5115 may be configured as a so-called flexible mirror having a flexible lens barrel 5117.

An opening in which an objective lens is fitted is provided at a tip of the lens barrel 5117. A light source device 5157 is connected to the endoscope 5115, and light generated by the light source device 5157 is guided to the tip of the lens barrel by a light guide extending inside the lens barrel 5117, and is radiated toward an observation target in the body cavity of the patient 5185 through the objective lens. The endoscope 5115 may be a direct endoscope, a perspective endoscope, or a side endoscope.

An optical system and an imaging element are provided inside the camera head 5119, and reflected light (observation light) from the observation target is condensed on the imaging element by the optical system. The observation light is photoelectrically converted by the imaging element, and an electrical signal corresponding to the observation light, that is, an image signal corresponding to an observation image is generated. The image signal is transmitted as RAW data to a camera control unit (CCU) 5153. The camera head 5119 has a function of adjusting the magnification and the focal length by appropriately driving the optical system.

For example, the camera head 5119 may be provided with a plurality of imaging elements in order to support stereoscopic viewing (3D display) or the like. In this case, a plurality of relay optical systems are provided inside the lens barrel 5117 in order to guide the observation light to the plurality of imaging elements.

(Various Devices Mounted in Cart)

The CCU 5153 is configured of a central processing unit (CPU), a graphics processing unit (GPU), or the like, and comprehensively controls operations of the endoscope 5115 and the display device 5155. Specifically, the CCU 5153 performs various image processing for displaying an image based on the image signal, such as development processing (demosaic processing), on the image signal received from the camera head 5119. The CCU 5153 provides an image signal subjected to the image processing to the display device 5155. Further, the audiovisual controller 5107 illustrated in FIG. 35 is connected to the CCU 5153. The CCU 5153 also provides an image signal subjected to image processing to the audiovisual controller 5107. Further, the CCU 5153 transmits a control signal to the camera head 5119 and controls driving thereof. The control signal may include information on imaging conditions such as a magnification or focal length. The information regarding the imaging condition may be input via an input device 5161 or may be input via the centralized operation panel 5111 described above.

The display device 5155 displays an image based on the image signal subjected to image processing by the CCU 5153 under the control of the CCU 5153. When the endoscope 5115 is compatible with shooting in high resolution such as 4K (3840 horizontal pixels×2160 vertical pixels) or 8K (7680 horizontal pixels×4320 vertical pixels) and/or is compatible with 3D display, a display device capable of a high-resolution display and/or a display device capable of a 3D display can be used as the display device 5155. When an endoscope is compatible with shooting in high resolution such as 4K or 8K, a further immersive feeling can be obtained using a display device having a size of 55 inches or more as the display device 5155. Further, a plurality of display devices 5155 having different resolutions and sizes may be provided depending on applications.

The light source device 5157 is configured of, for example, a light source such as a light emitting diode (LED), and supplies irradiation light in surgical site shooting to the endoscope 5115.

The arm control device 5159 is configured of a processor such as a CPU, and operates according to a predetermined program to control the drive of the arm portion 5145 of the support arm device 5141 according to a predetermined control scheme.

The input device 5161 is an input interface for the endoscopic surgery system 5113. The user can input various types of information or instructions to the endoscopic surgery system 5113 via the input device 5161. For example, the user inputs various types of information regarding the surgery, such as physical information of the patient or information on a surgical procedure, via the input device 5161. Further, for example, the user inputs an instruction to drive the arm portion 5145, an instruction to change imaging conditions (type of irradiation light, magnification, focal length, or the like) of the endoscope 5115, an instruction to drive the energy treatment tool 5135, and the like via the input device 5161.

A type of input device 5161 is not limited, and the input device 5161 may be various known input devices. As the input device 5161, for example, a mouse, a keyboard, a touch panel, a switch, a foot switch 5171, and/or a lever can be applied. When a touch panel is used as the input device 5161, the touch panel may be provided on the display surface of the display device 5155.

Alternatively, the input device 5161 is a device worn by the user, such as a glasses-type wearable device or a head mounted display (HMD), and various inputs are performed according to a gesture or line of sight of the user detected by these devices. Further, the input device 5161 includes a camera capable of detecting a motion of the user, and various inputs are performed according to the gesture or the line of sight of the user detected from the video captured by the camera. Further, the input device 5161 includes a microphone capable of picking up a voice of the user, and various inputs are performed by voice through the microphone. When the input device 5161 is configured to be able to input various types of information in a non-contact manner in this way, particularly, a user belonging to a clean area (for example, the surgeon 5181) can operate devices belonging to a dirty area in a non-contact manner. Further, the user can operate the devices without taking his/her hands off a surgical tool that he/she holds, which improves the convenience for the user.

A treatment tool control device 5163 controls the drive of the energy treatment tool 5135 for cauterization and incision of tissue, sealing of blood vessels, and the like. A pneumoperitoneum device 5165 sends a gas into the body cavity of the patient 5185 via the pneumoperitoneum tube 5133 in order to inflate the body cavity of the patient 5185 for the purpose of securing of the field of view using the endoscope 5115 and securing a work space of the surgeon. A recorder 5167 is a device capable of recording various types of information on the surgery. A printer 5169 is a device capable of printing various types of information on surgery in various formats such as text, images, and graphs.

Hereinafter, a particularly characteristic configuration in the endoscopic surgery system 5113 will be described in more detail.

(Support Arm Device)

The support arm device 5141 includes a base portion 5143 that is a base, and an arm portion 5145 that extends from the base portion 5143. In the illustrated example, the arm portion 5145 is configured of the plurality of joint portions 5147a, 5147b, and 5147c, and the plurality of links 5149a, 5149b connected by the joint portions 5147b, but a configuration of the arm portion 5145 is illustrated in FIG. 37 in a simplified manner for simplicity. Actually, a shape, number, and disposition of the joint portions 5147a to 5147c and the links 5149a and 5149b, a direction of the rotation axis of the joint portions 5147a to 5147c, and the like are appropriately set so that the arm portion 5145 has a desired degree of freedom. For example, the arm portion 5145 can be preferably configured to have at least 6 degrees of freedom. Accordingly, since the endoscope 5115 can be freely moved in a movable range of the arm portion 5145, the lens barrel 5117 of the endoscope 5115 can be inserted into the body cavity of the patient 5185 from a desired direction.

Actuators are provided in the joint portions 5147a to 5147c, and the joint portions 5147a to 5147c are configured to be rotatable around a predetermined rotation axis by driving the actuators. By the drive of the actuator being controlled by the arm control device 5159, rotation angles of the joint portions 5147a to 5147c are controlled and the drive of the arm portion 5145 is controlled. Thereby, control of the position and posture of the endoscope 5115 can be realized. In this case, the arm control device 5159 can control the drive of the arm portion 5145 using various known control schemes such as force control or position control.

For example, when the surgeon 5181 appropriately performs an operation input via the input device 5161 (including the foot switch 5171), the arm control device 5159 may appropriately control the drive of the arm portion 5145 in response to the operation input and control the position and posture of the endoscope 5115. With this control, it is possible to move the endoscope 5115 at the tip of the arm portion 5145 from an arbitrary position to an arbitrary position and then fixedly support the endoscope 5115 at the position after the movement. The arm portion 5145 may be operated by a so-called primary/secondary scheme. In this case, the arm portion 5145 can be remotely controlled by the user via the input device 5161 installed at a place away from the operating room.

Further, when force control is applied, the arm control device 5159 may perform so-called power assist control in which the arm control device 5159 receives an external force from the user and drives actuators of the respective joint portions 5147a to 5147c so that the arm portion 5145 moves smoothly according to the external force. Accordingly, when the user moves the arm portion 5145 while directly touching the arm portion 5145, the arm portion 5145 can be moved with a relatively light force. Therefore, it is possible to move the endoscope 5115 more intuitively and with a simpler operation, and to improve the convenience for the user.

Here, in general, in the endoscopic surgery, the endoscope 5115 is supported by a doctor called a scopist. On the other hand, since the position of the endoscope 5115 can be fixed more reliably without manpower by using the support arm device 5141, the image of the surgical site can be stably obtained, the surgery can be performed smoothly.

The arm control device 5159 may not necessarily be provided in the cart 5151. Further, the arm control device 5159 may not necessarily be one device. For example, the arm control device 5159 may be provided at each of the joint portions 5147a to 5147c of the arm portion 5145 of the support arm device 5141, and drive and control of the arm portion 5145 may be realized by a plurality of arm control devices 5159 cooperating with each other.

(Light Source Device)

The light source device 5157 supplies the endoscope 5115 with the irradiation light in surgical site shooting. The light source device 5157 is configured of, for example, an LED, a laser light source, or a white light source configured of a combination thereof. In this case, when the white light source is configured through a combination of RGB laser light sources, an output intensity and output timing of each color (each wavelength) can be controlled with high accuracy, and thus, it is possible to perform adjustment of white balance of the captured image in the light source device 5157. Further, in this case, the observation target is irradiated with the laser light from the respective RGB laser light sources in a time-divided manner, and the drive of the imaging element of the camera head 5119 is controlled in synchronization with an irradiation timing thereof so that the image corresponding to the respective RGB can be captured in a time-divided manner. According to this method, it is possible to obtain a color image without providing a color filter to the imaging element.

Further, the drive of the light source device 5157 may be controlled so that intensity of output light is changed at predetermined time intervals. It is possible to generate a so-called high dynamic range image without blackout and overexposure by controlling the drive of the imaging element of the camera head 5119 in synchronization with a timing of the change of the light intensity to acquire the image in time division and combining the images.

Further, the light source device 5157 may be configured to be able to supply light in a predetermined wavelength band corresponding to special light observation. In the special light observation, for example, light in a narrower band than the irradiation light (that is, white light) in normal observation is radiated using dependence of light absorption on a wavelength in body tissue, so that so-called narrow band light observation (narrow band imaging) in which a predetermined tissue such as a blood vessel on a surface layer of a mucous membrane is shot with high contrast is performed. Alternatively, in the special light observation, fluorescence observation in which an image is obtained by fluorescence generated by radiating the excitation light may be performed. In the fluorescence observation, the body tissue is irradiated with the excitation light and the fluorescence from the body tissue is observed (autofluorescence observation), or a reagent such as indocyanine green (ICO) is locally injected into the body tissue, and the body tissue is irradiated with excitation light corresponding to a fluorescence wavelength of the reagent so that a fluorescence image is obtained. The light source device 5157 may be configured to be able to supply narrow band light and/or excitation light corresponding to such special light observation.

(Camera Head and CCU)

Figure 38:
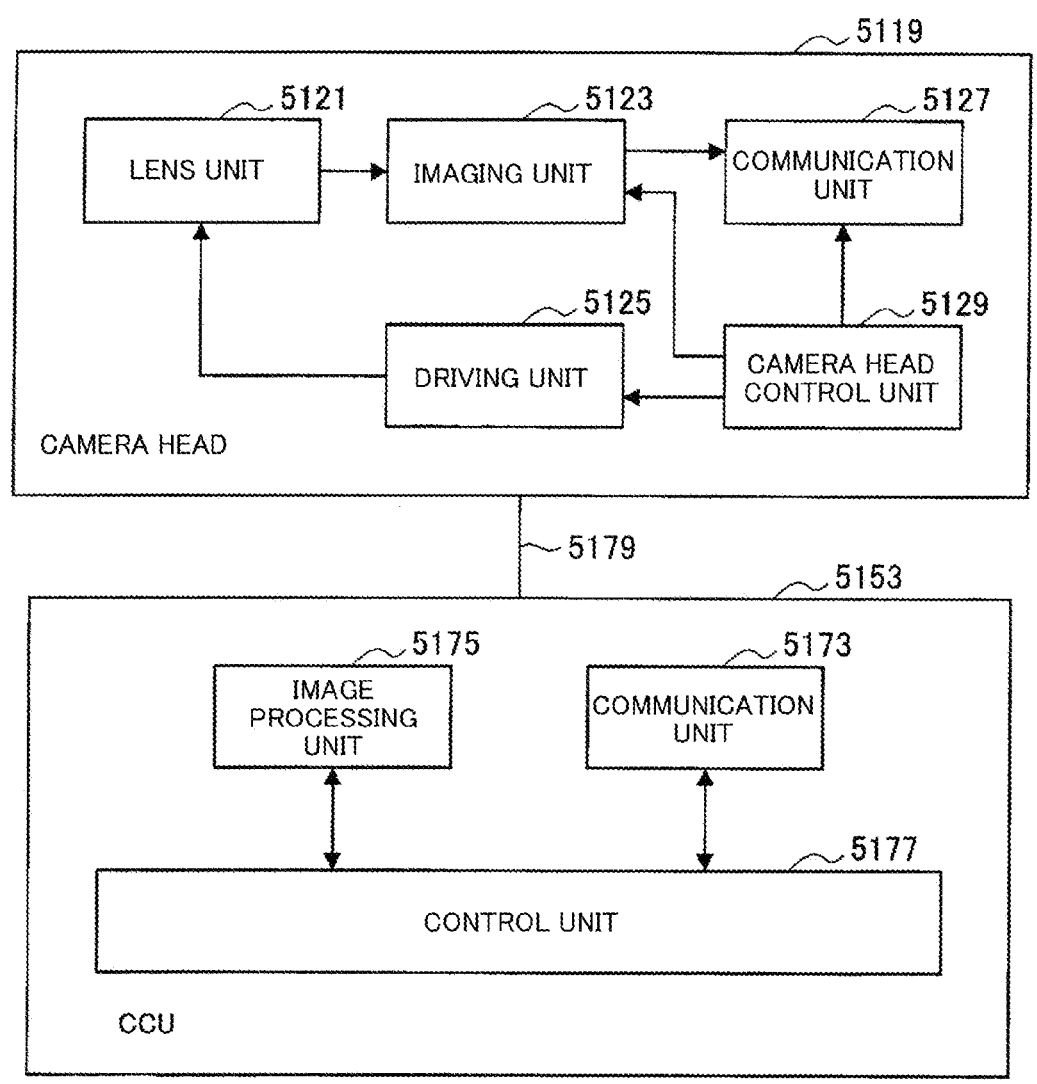
FIG. 38 is a block diagram illustrating an example of a functional configuration of a camera head and a CCU illustrated in FIG. 37.

Functions of the camera head 5119 and the CCU 5153 of the endoscope 5115 will be described in more detail with reference to FIG. 38. FIG. 38 is a block diagram illustrating an example of a functional configuration of the camera head 5119 and the CCU 5153 illustrated in FIG. 37.

Referring to FIG. 38, the camera head 5119 includes a lens unit 5121, an imaging unit 5123, a drive unit 5125, a communication unit 5127, and a camera head control unit 5129 as functions thereof. Further, the CCU 5153 includes a communication unit 5173, an image processing unit 5175, and a control unit 5177 as functions thereof. The camera head 5119 and the CCU 5153 are bidirectionally communicatively connected by a transmission cable 5179.

First, a functional configuration of the camera head 5119 will be described. The lens unit 5121 is an optical system provided at a connection portion with the lens barrel 5117. The observation light taken in from the tip of the lens barrel 5117 is guided to the camera head 5119 and incident on the lens unit 5121. The lens unit 5121 is configured as a combination of a plurality of lenses including a zoom lens and a focus lens. Optical characteristics of the lens unit 5121 are adjusted so that the observation light is condensed on a light reception surface of the imaging element of the imaging unit 5123. Further, the zoom lens and the focus lens are configured so that positions thereof on the optical axis can be moved for adjustment of a magnification and a focus of the captured image.

The imaging unit 5123 is configured of an imaging element and is disposed in a stage after the lens unit 5121. The observation light that has passed through the lens unit 5121 is condensed on the light reception surface of the imaging element, and an image signal corresponding to the observation image is generated through photoelectric conversion. The image signal generated by the imaging unit 5123 is provided to the communication unit 5127.

A complementary metal oxide semiconductor (CMOS) type image sensor having a Bayer array and capable of color shooting, for example, is used as the imaging element constituting the imaging unit 5123. An imaging element capable of supporting capturing of a 4K or more high-resolution image, for example, may be used as the imaging element. When the image of the surgical site is obtained in high resolution, the surgeon 5181 can ascertain a state of the surgical site in more detail, and proceed with the surgery more smoothly.

Further, the imaging element constituting the imaging unit 5123 is configured to have a pair of imaging elements for acquiring respective image signals for a right eye and a left eye corresponding to a 3D display. The 3D display enables the surgeon 5181 to ascertain a depth of a living tissue in the surgical site more accurately. When the imaging unit 5123 is configured of a multi-plate type, a plurality of lens units 5121 are also provided in correspondence to the respective imaging elements.

Further, the imaging unit 5123 may not be necessarily provided in the camera head 5119. For example, the imaging unit 5123 may be provided immediately after the objective lens inside the lens barrel 5117.

The drive unit 5125 is configured of an actuator, and moves the zoom lens and focus lens of the lens unit 5121 by a predetermined distance along an optical axis under the control of the camera head control unit 5129. Accordingly, a magnification and focus of the image captured by the imaging unit 5123 can be adjusted appropriately.

The communication unit 5127 is configured of a communication device for transmitting and receiving various types of information to and from the CCU 5153. The communication unit 5127 transmits the image signal obtained from the imaging unit 5123 as RAW data to the CCU 5153 via the transmission cable 5179. In this case, it is preferable for the image signal to be transmitted through optical communication in order to display the captured image of the surgical site with low latency. This is because, since the surgeon 5181 performs the surgery while observing the state of the affected part using the captured image in the surgery, a moving image of the surgical site is required to be displayed in real time as much as possible for safer and more reliable surgery. When optical communication is performed, the communication unit 5127 is provided with a photoelectric conversion module that converts an electrical signal into an optical signal. The image signal is converted into an optical signal by the photoelectric conversion module and then transmitted to the CCU 5153 via the transmission cable 5179.

Further, the communication unit 5127 receives a control signal for controlling the drive of the camera head 5119 from the CCU 5153. The control signal includes, for example, information on imaging conditions, such as information for designating a frame rate of the captured image, information for designating an exposure value at the time of imaging, and/or information for designating a magnification and focus of the captured image. The communication unit 5127 provides the received control signal to the camera head control unit 5129. The control signal from the CCU 5153 may also be transmitted by optical communication. In this case, the communication unit 5127 is provided with a photoelectric conversion module that converts an optical signal into an electrical signal, and the control signal is converted into an electrical signal by the photoelectric conversion module and then provided to the camera head control unit 5129.

The imaging conditions such as a frame rate, an exposure value, a magnification, and a focus are automatically set by the control unit 5177 of the CCU 5153 on the basis of the acquired image signal. That is, a so-called auto exposure (AE) function, auto focus (AF) function, and auto white balance (AWB) function are mounted in the endoscope 5115.

The camera head control unit 5129 controls the drive of the camera head 5119 on the basis of the control signal from the CCU 5153 received via the communication unit 5127. For example, the camera head control unit 5129 controls the drive of the imaging element of the imaging unit 5123 on the basis of the information for designating the frame rate of the captured image and/or the information for designating the exposure at the time of imaging. Further, for example, the camera head control unit 5129 appropriately moves the zoom lens and the focus lens of the lens unit 5121 via the drive unit 5125 on the basis of the information for designating the magnification and the focus of the captured image. The camera head control unit 5129 may further have a function of storing information for identifying the lens barrel 5117 or the camera head 5119.

The camera head 5119 can be made resistant to autoclave sterilization processing by disposing the configuration of the lens unit 5121, the imaging unit 5123, or the like in a sealed structure having high airtightness and waterproofness.

Next, a functional configuration of the CCU 5153 will be described. The communication unit 5173 is configured of a communication device for transmitting and receiving various types of information to and from the camera head 5119. The communication unit 5173 receives the image signal transmitted from the camera head 5119 via the transmission cable 5179. In this case, the image signal can be suitably transmitted by optical communication, as described above. In this case, for optical communication, the communication unit 5173 is provided with a photoelectric conversion module that converts an optical signal into an electrical signal. The communication unit 5173 provides the image processing unit 5175 with an image signal converted into an electrical signal.

Further, the communication unit 5173 transmits a control signal for controlling the drive of the camera head 5119 to the camera head 5119. The control signal may also be transmitted by optical communication.

The image processing unit 5175 performs various image processing on the image signal which is the RAW data transmitted from the camera head 5119. The image processing includes, for example, various known signal processing, such as development processing, high image quality processing (for example, band enhancement processing, super-resolution processing, noise reduction (NR) processing, and/or camera shake correction processing), and/or enlargement processing (electronic zoom processing). Further, the image processing unit 5175 performs detection processing for performing AE, AF, and AWB on the image signal.

The image processing unit 5175 is configured of a processor such as a CPU or GPU, and when the processor operates according to a predetermined program, the above-described image processing or detection processing can be performed. When the image processing unit 5175 is configured of a plurality of GPUs, the image processing unit 5175 appropriately divides information related to the image signal and performs image processing in parallel using the plurality of GPUs.

The control unit 5177 performs various controls regarding the imaging of the surgical site using the endoscope 5115 and the display of the captured image thereof. For example, the control unit 5177 generates the control signal for controlling the drive of the camera head 5119. In this case, when the imaging condition is input by the user, the control unit 5177 generates a control signal on the basis of the input of the user. Alternatively, when AE function, the AF function, and the AWB function are mounted in the endoscope 5115, the control unit 5177 appropriately calculates an optimum exposure value, focal length, and white balance according to a result of the detection processing in the image processing unit 5175 and generates a control signal.

Further, the control unit 5177 causes the display device 5155 to display the image of the surgical site on the basis of the image signal subjected to image processing by the image processing unit 5175. In this case, the control unit 5177 recognizes various objects in the surgical site image using various image recognition technologies. For example, the control unit 5177 can detect a shape, color, or the like of an edge of an object included in the surgical site image to recognize surgical tools such as forceps, a specific biological part, bleeding, mist at the time of using the energy treatment tool 5135, and the like. When the control unit 5177 causes the display device 5155 to display the image of the surgical site, the control unit 5177 causes various types of surgical support information to be superimposed on the image of the surgical site and displayed using a result of the recognition. When the surgical support information is superimposed, displayed, and presented to the surgeon 5181, it becomes possible to proceed with the surgery more safely and surely.

The transmission cable 5179 that connects the camera head 5119 to the CCU 5153 is an electrical signal cable that supports electrical signal communication, an optical fiber that supports optical communication, or a composite cable thereof.

Here, in the illustrated example, the communication is performed by wire using the transmission cable 5179, but the communication between the camera head 5119 and the CCU 5153 may be performed wirelessly. When the communication between the camera head 5119 and the CCU 5153 is performed wirelessly, it is not necessary to install the transmission cable 5179 in the operating room, and thus, a situation in which a movement of the medical staff in the operating room is hindered by the transmission cable 5179 can be solved.

An example of the operating room system 5100 to which the technology according to the present disclosure can be applied has been described above. A case in which a medical system to which the operating room system 5100 is applied is the endoscopic surgery system 5113 has been described herein as an example, but a configuration of the operating room system 5100 is not limited to such an example. For example, the operating room system 5100 may be applied to an examination flexible endoscopic system or a microsurgery system instead of the endoscopic surgery system 5113.

The technology according to the present disclosure can be suitably applied to CCU 5153 in the configuration described above. Specifically, the above-described modification processing is performed on the image signal received from the endoscope 5115 to reduce or cancel the delay time, so that the modified display image data is generated and displayed on the display device 5155 serving as a display unit. It is possible to enhance the safety of treatment due to a deviation between an image currently captured by the endoscope 5115 and an image displayed delayed due to the display delay time by applying the technology according to the present disclosure to the CCU 5153.

10. Application Example 2

The technology according to the present disclosure can be applied to various products. For example, the technology according to the present disclosure may be realized as a device mounted in a type of moving body of any one of an automobile, an electric vehicle, a hybrid electric vehicle, a motorcycle, a bicycle, a personal mobility, an airplane, a drone, a ship, a robot, a construction machine, an agricultural machine (tractor), and the like.

Figure 39:
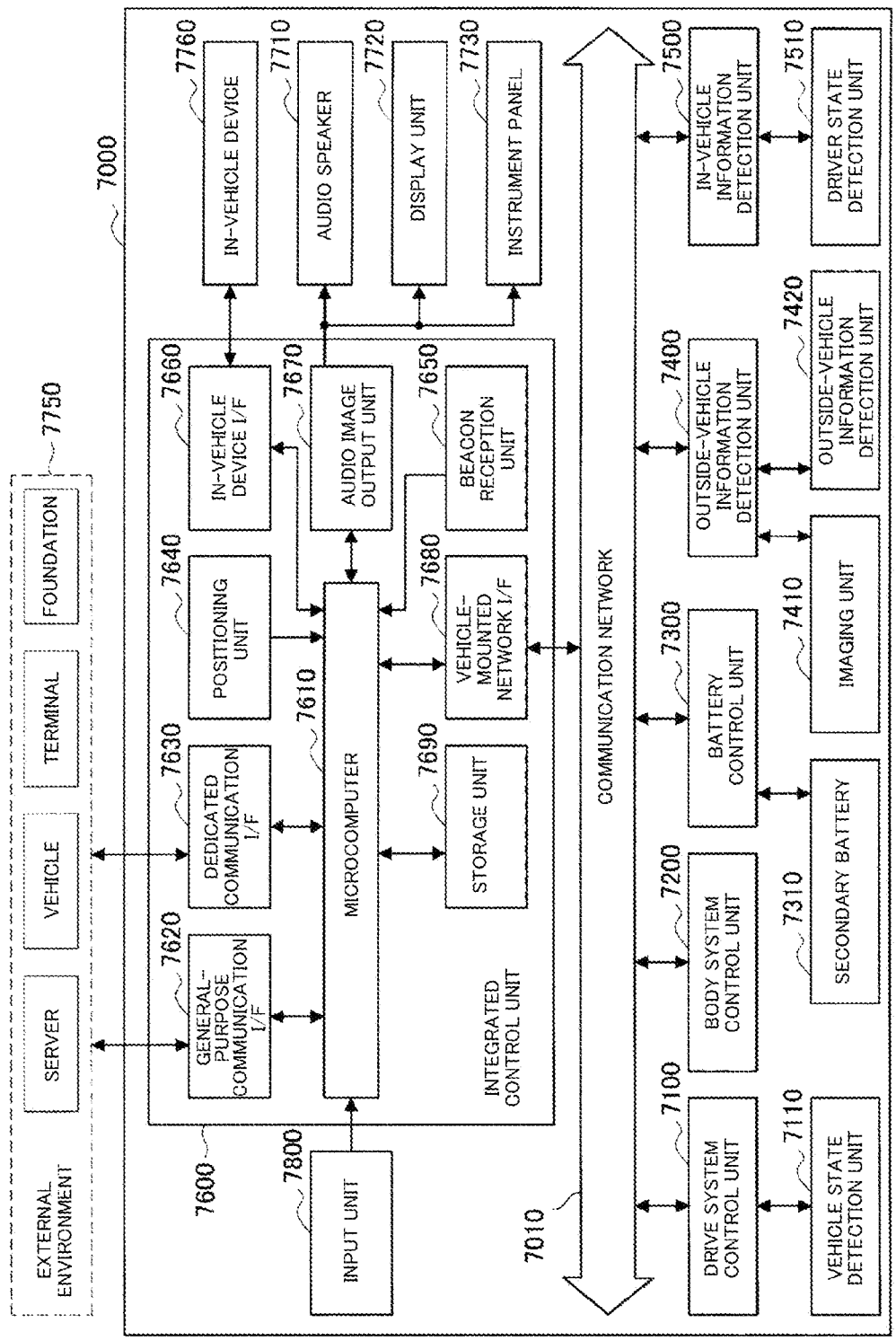
FIG. 39 is a block diagram illustrating an example of a schematic configuration of a vehicle control system.

FIG. 39 is a block diagram illustrating a schematic configuration example of a vehicle control system 7000, which is an example of a mobile control system to which the technology according to the present disclosure can be applied. The vehicle control system 7000 includes a plurality of electronic control units connected via a communication network 7010. In the example illustrated in FIG. 39, the vehicle control system 7000 includes a drive system control unit 7100, a body system control unit 7200, a battery control unit 7300, an outside-vehicle information detection unit 7400, an in-vehicle information detection unit 7500, and an integrated control unit 7600. The communication network 7010 connecting the plurality of control units may be an in-vehicle communication network conforming to any standard such as controller area network (CAN), local interconnect network (LIN), LAN (local area network), or FlexRay (registered trademark).

Each of the control units includes a microcomputer that performs arithmetic processing according to various programs, a storage unit that stores programs executed by the microcomputer, parameters used for various calculations, and the like, and a drive circuit that drives various control target devices. Each control unit includes a network I/F for performing communication with other control units via the communication network 7010, and includes a communication I/F for performing communication through wired communication or wireless communication with devices, sensors, or the like inside or outside the vehicle. In FIG. 39, a microcomputer 7610, a general-purpose communication I/F 7620, a dedicated communication I/F 7630, a positioning unit 7640, a beacon reception unit 7650, an in-vehicle device I/F 7660, an audio image output unit 7670, a vehicle-mounted network I/F 7680, and a storage unit 7690 are shown as functional configurations of the integrated control unit 7600. The other control units also include a microcomputer, a communication I/F, a storage unit, and the like.

The drive system control unit 7100 controls operation of devices related to a drive system of the vehicle according to various programs. For example, the drive system control unit 7100 functions as a control device for a driving force generation device for generating a driving force of the vehicle such as an internal combustion engine or a drive motor, a driving force transmission mechanism for transmitting the driving force to wheels, a steering mechanism for adjusting a steering angle of the vehicle, and a braking device for generating a braking force of a vehicle. The drive system control unit 7100 may have a function of a control device of an antilock brake system (ABS), an electronic stability control (ESC), or the like.

A vehicle state detection unit 7110 is connected to the drive system control unit 7100. The vehicle state detection unit 7110 includes, for example, at least one of a gyro sensor that detects an angular velocity of an axial rotation motion of a vehicle body, an acceleration sensor that detects an acceleration of a vehicle, and sensors for detecting an amount of operation with respect to an accelerator pedal, an amount of operation with respect to a brake pedal, a steering angle of a steering wheel, an engine speed, a rotation speed of wheels, and the like. The drive system control unit 7100 performs arithmetic processing using a signal input from the vehicle state detection unit 7110 to control an internal combustion engine, a drive motor, an electric power steering device, a brake device, and the like.

The body system control unit 7200 controls the operation of various devices mounted in the vehicle body according to various programs. For example, the body system control unit 7200 functions as a control device for a keyless entry system, a smart key system, a power window device, or various lamps such as headlamps, back lamps, brake lamps, blinkers or fog lamps. In this case, radio waves transmitted from a portable device that substitutes for a key or signals of various switches may be input to the body system control unit 7200. The body system control unit 7200 receives inputs of the radio waves or signals and controls a door lock device, a power window device, a lamp, and the like of the vehicle.

The battery control unit 7300 controls a secondary battery 7310, which is a power supply source of the drive motor, according to various programs. For example, information such as a battery temperature, a battery output voltage, or a remaining capacity of the battery is input to the battery control unit 7300 from a battery device including the secondary battery 7310. The battery control unit 7300 performs arithmetic processing using these signals, and performs temperature adjustment control of the secondary battery 7310, a cooling device included in the battery device, or the like.

The outside-vehicle information detection unit 7400 detects information on the outside of the vehicle in which the vehicle control system 7000 has been mounted. For example, at least one of the imaging unit 7410 and the outside-vehicle information detection unit 7420 is connected to the outside-vehicle information detection unit 7400. The imaging unit 7410 includes at least one of a time of flight (ToF) camera, a stereo camera, a monocular camera, an infrared camera, and other cameras. The outside-vehicle information detection unit 7420 includes, for example, at least one of an environmental sensor for detecting a current weather, or a surroundings information detection sensor for detecting other vehicles, obstacles, pedestrians, or the like around the vehicle in which the vehicle control system 7000 has been mounted.

The environmental sensor may be, for example, at least one of a raindrop sensor that detects rainy weather, a fog sensor that detects fog, a sunshine sensor that detects a degree of sunshine, and a snow sensor that detects snowfall. The surroundings information detection sensor may be at least one of an ultrasonic sensor, a radar device, and a LIDAR (Light Detection and Ranging or Laser Imaging Detection and Ranging) device. The imaging unit 7410 and the outside-vehicle information detection unit 7420 may be included as independent sensors or devices or may be included as a device in which a plurality of sensors or devices are integrated.

Figure 40:
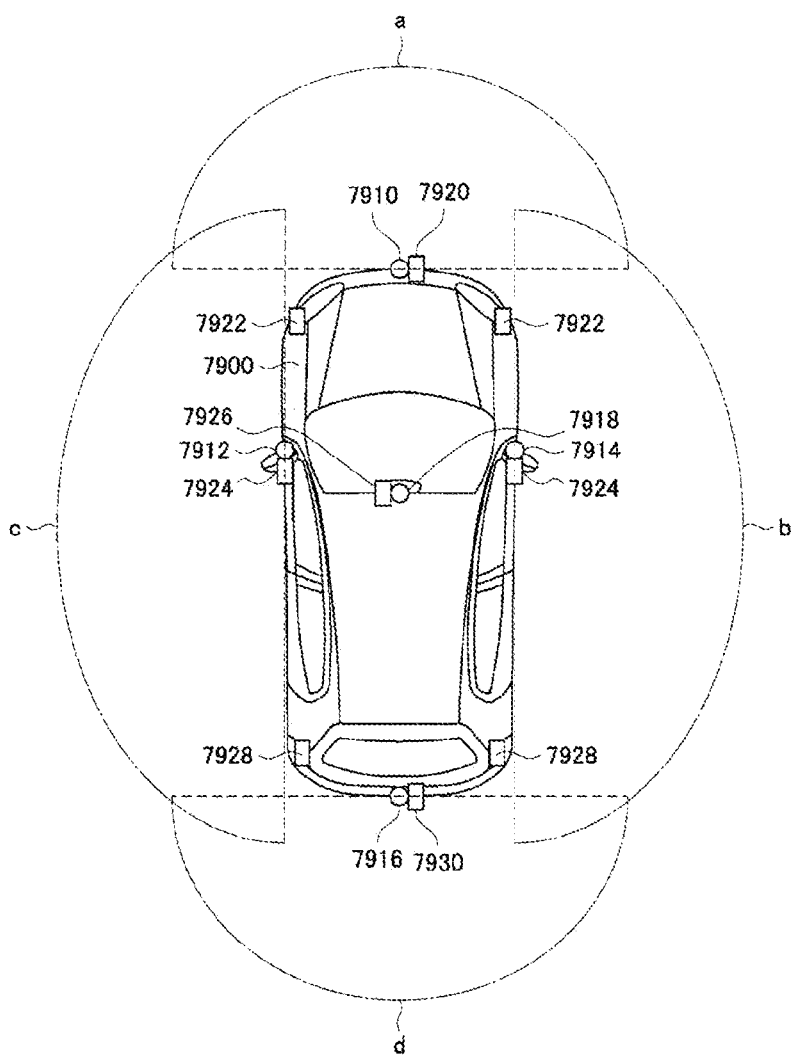
FIG. 40 is an illustrative diagram illustrating an example of installation positions of an outside-vehicle information detection unit and an imaging unit.

Here, FIG. 40 illustrates an example of installation positions of the imaging unit 7410 and the outside-vehicle information detection unit 7420. Imaging units 7910, 7912, 7914, 7916, and 7918 are provided, for example, at at least one of a front nose, side mirrors, a rear bumper, a back door, and an upper part of a windshield in a vehicle cabin of the vehicle 7900. The imaging unit 7910 included in the front nose and the imaging unit 7918 included in the upper part of the windshield in the vehicle cabin mainly acquire an image in front of the vehicle 7900. The imaging units 7912 and 7914 included in the side mirrors mainly acquire images of the sides of the vehicle 7900. The imaging unit 7916 included in the rear bumper or the back door mainly acquires an image of the rear of the vehicle 7900. The imaging unit 7918 included in the upper part of the windshield in the vehicle cabin is mainly used for detection of a preceding vehicle, a pedestrian, an obstacle, a traffic light, a traffic sign, a lane, or the like.

In FIG. 40, an example of shooting ranges of the respective imaging units 7910, 7912, 7914, and 7916 is illustrated. An imaging range a indicates an imaging range of the imaging unit 7910 provided on the front nose, imaging ranges b and c indicate imaging ranges of the imaging units

7912 and 7914 provided on the side mirrors, and an imaging range d indicates an imaging range of the imaging unit 7916 provided on the rear bumper or the back door. For example, a bird's-eye view image of the vehicle 7900 as viewed from above can be obtained when the image data captured by the imaging units 7910, 7912, 7914, and 7916 are superimposed.

The outside-vehicle information detection units 7920, 7922, 7924, 7926, 7928, and 7930 provided on the front, rear, side, corners, and an upper part of the windshield in the vehicle cabin of the vehicle 7900 may be, for example, ultrasonic sensors or radar devices. The outside-vehicle information detection units 7920, 7926, and 7930 provided on the front nose, rear bumper, back door, and upper part of the windshield in the vehicle cabin of the vehicle 7900 may be, for example, LIDAR devices. These outside-vehicle information detection units 7920 to 7930 are mainly used for detection of preceding vehicles, pedestrians, obstacles, or the like.

The description will be continued with reference to FIG. 39 again. The outside-vehicle information detection unit 7400 causes the imaging unit 7410 to capture an image of the outside of the vehicle and receives the captured image data. Further, the outside-vehicle information detection unit 7400 receives detection information from the connected outside-vehicle information detection unit 7420. When the outside-vehicle information detection unit 7420 is an ultrasonic sensor, a radar device, or a LIDAR device, the outside-vehicle information detection unit 7400 transmits ultrasonic waves, electromagnetic waves, or the like, and receives information on received reflected waves. The outside-vehicle information detection unit 7400 may perform object detection processing or distance detection processing for a person, a vehicle, an obstacle, a sign, or a character on a road surface on the basis of the received information. The outside-vehicle information detection unit 7400 may perform environment recognition processing for recognizing rainfall, fog, road surface situation, or the like on the basis of the received information. The outside-vehicle information detection unit 7400 may calculate a distance to an object outside the vehicle on the basis of the received information.

Further, the outside-vehicle information detection unit 7400 may perform image recognition processing or distance detection processing for recognizing a person, a vehicle, an obstacle, a sign, a character on a road surface, or the like on the basis of the received image data. The outside-vehicle information detection unit 7400 may perform processing such as distortion correction or alignment on the received image data, and combine image data captured by the different imaging units 7410 to generate a bird's-eye view image or a panoramic image. The outside-vehicle information detection unit 7400 may perform viewpoint conversion processing using the image data captured by the different imaging units 7410.

The in-vehicle information detection unit 7500 detects information on the inside of the vehicle. For example, a driver state detection unit 7510 that detects a driver's state is connected to the in-vehicle information detection unit 7500. The driver state detection unit 7510 may include a camera that images a driver, a biosensor that detects biological information of the driver, a microphone that collects sound in the vehicle cabin, and the like. The biosensor is provided in, for example, a seat surface or the steering wheel, and detects biometric information of a passenger sitting on a seat or the driver holding the steering wheel. The in-vehicle information detection unit 7500 may calculate a degree of fatigue or a degree of concentration of the driver on the basis of the detection information input from the driver state detection unit 7510, and may determine whether or not the driver is dozing. The in-vehicle information detection unit 7500 may perform processing such as noise canceling processing on the collected audio signal.

The integrated control unit 7600 controls an overall operation in the vehicle control system 7000 according to various programs. An input unit 7800 is connected to the integrated control unit 7600. The input unit 7800 is realized by a device such as a touch panel, a button, a microphone, a switch, or a lever, which can be input-operated by a passenger. Data obtained by recognizing a voice input by the microphone may be input to the integrated control unit 7600. The input unit 7800 may be, for example, a remote control device in which infrared rays or other radio waves have been used, or may be an externally connected device such as a mobile phone or a personal digital assistant (PDA) that supports an operation with respect to the vehicle control system 7000. The input unit 7800 may be, for example, a camera and, in this case, a passenger can input information through gesture. Alternatively, data obtained by detecting a motion of a wearable device worn by the passenger may be input. Further, the input unit 7800 may include, for example, an input control circuit that generates an input signal on the basis of information input by a passenger or the like using the input unit 7800 and outputs the input signal to the integrated control unit 7600. A passenger or the like operates the input unit 7800 to input various pieces of data to the vehicle control system 7000 or instruct a processing operation.

The storage unit 7690 may include a read only memory (ROM) that stores various programs that are executed by the microcomputer, and a random access memory (RAM) that stores various parameters, calculation results, sensor values, and the like. Further, the storage unit 7690 may be realized by a magnetic storage device such as a hard disk drive (HDD), a semiconductor storage device, an optical storage device, an optical magnetic storage device, or the like.

The general-purpose communication I/F 7620 is a general-purpose communication I/F that mediates communication with various devices present in an external environment 7750. The general-purpose communication I/F 7620 may include a cellular communication protocol such as Global System of Mobile communications (GSM; registered trademark), WiMAX (registered trademark), Long Term Evolution (LTE; registered trademark), or LTE-A (LTE-Advanced), or other wireless communication protocols such as wireless LAN (also referred to as Wi-Fi (registered trademark)) or Bluetooth (registered trademark) implemented therein. The general-purpose communication I/F 7620 may connect to, for example, a device (for example, an application server or a control server) present on an external network (for example, the Internet, a cloud network, or a business-specific network) via a base station or an access point. Further, the general-purpose communication I/F 7620 may connect to a terminal present near the vehicle (for example, a terminal of a driver, a pedestrian, or a store, or a machine type communication (MTC) terminal) using, for example, a peer to peer (P2P) technology.

The dedicated communication I/F 7630 is a communication I/F that supports a communication protocol designed for use in vehicles. For example, the dedicated communication I/F 7630 may be equipped with a standard protocol such as wireless access in vehicle environment (WAVE), which is a combination of lower layer IEEE 802.11p and upper layer IEEE 1609, dedicated short range communications (DSRCs), or a cellular communication protocol. The dedicated communication I/F 7630 typically performs V2X communication, which is a concept that includes one or more of vehicle-to-vehicle communication, vehicle-to-infrastructure communication, vehicle-to-home communication, and vehicle-to-pedestrian communication.

The positioning unit 7640 receives, for example, a GNSS signal from a global navigation satellite system (GNSS) satellite (for example, a GPS signal from a global positioning system (GPS) satellite), executes positioning, and generates position information including a latitude, longitude, and altitude of the vehicle. The positioning unit 7640 may specify a current position by exchanging signals with a wireless access point, or may acquire position information from a terminal such as a mobile phone, PHS, or smartphone having a positioning function.

The beacon reception unit 7650 receives radio waves or electromagnetic waves transmitted from a radio station or the like installed on a road, and acquires information such as a current position, traffic jam, no throughfare, or required time. A function of the beacon reception unit 7650 may be included in the above-described dedicated communication I/F 7630.

The in-vehicle device I/F 7660 is a communication interface that mediates a connection between the microcomputer 7610 and various in-vehicle devices 7760 present in the vehicle. The in-vehicle device I/F 7660 may establish a wireless connection using a wireless communication protocol such as wireless LAN, Bluetooth (registered trademark), Near Field Communication (NFC), or wireless USB (WUSB). Further, the in-vehicle device I/F 7660 may establish a wired connection such as a universal serial bus (USB), high-definition multimedia interface (HDMI; registered trademark), or mobile high-definition link (MHL) via a connection terminal (not illustrated) (and a cable if necessary). The in-vehicle device 7760 may include, for example, at least one of a mobile device or wearable device of a passenger and an information device carried in or attached to the vehicle. Further, the in-vehicle device 7760 may include a navigation device that searches for a route to an arbitrary destination. The in-vehicle device I/F 7660 exchanges control signals or data signals with the in-vehicle devices 7760.

The vehicle-mounted network I/F 7680 is an interface that mediates communication between the microcomputer 7610 and the communication network 7010. The vehicle-mounted network I/F 7680 transmits and receives signals or the like according to a predetermined protocol supported by the communication network 7010.

The microcomputer 7610 of the integrated control unit 7600 controls the vehicle control system 7000 according to various programs on the basis of information acquired via at least one of the general-purpose communication I/F 7620, the dedicated communication I/F 7630, the positioning unit 7640, the beacon reception unit 7650, the in-vehicle device I/F 7660, and the vehicle-mounted network I/F 7680. For example, the microcomputer 7610 may calculate a control target value of the driving force generation device, the steering mechanism, or the braking device on the basis of the acquired information inside and outside the vehicle, and output a control command to the drive system control unit 7100. For example, the microcomputer 7610 may perform cooperative control for the purpose of realization of functions of an advanced driver assistance system (ADAS) including vehicle collision avoidance or impact mitigation, follow-up traveling based on an inter-vehicle distance, vehicle speed maintenance traveling, vehicle collision warning, vehicle lane deviation warning, and the like. Further, the microcomputer 7610 may perform cooperative control for the purpose of, for example, automated driving in which a vehicle travels autonomously without relying on an operation of the driver, by controlling the driving force generation device, the steering mechanism, the braking device, or the like on the basis of acquired information on the surroundings of the vehicle.

The microcomputer 7610 may generate three-dimensional distance information between the vehicle and an object such as a surrounding structure or a person on the basis of information acquired via at least one of the general-purpose communication I/F 7620, the dedicated communication I/F 7630, the positioning unit 7640, the beacon reception unit 7650, the in-vehicle device I/F 7660, and the vehicle-mounted network I/F 7680, and create local map information including surroundings information of a current position of the vehicle. Further, the microcomputer 7610 may predict a danger of a vehicle collision, approach of a pedestrian or the like or entrance into a closed road on the basis of acquired information, and generate a warning signal. The warning signal may be, for example, a signal for generating a warning sound or turning on a warning lamp.

The audio image output unit 7670 transmits an output signal of at least one of an audio and an image to an output device capable of visually or audibly notifying a passenger of the vehicle or the outside of the vehicle of information. In the example of FIG. 39, an audio speaker 7710, a display unit 7720, and an instrument panel 7730 are exemplified as the output devices. The display unit 7720 may include, for example, at least one of an onboard display and a heads-up display. The display unit 7720 may have an augmented reality (AR) display function. The output device may be another device other than such devices, such as a wearable device such as a headphone, a spectacle-type display worn by a passenger, a projector, or a lamp. When the output device is a display device, the display device visually displays results obtained by various types of processing performed by the microcomputer 7610 or information received from other control units in various formats such as texts, images, tables, and graphs. Further, when the output device is an audio output device, the audio output device converts an audio signal including reproduced audio data, acoustic data, or the like into an analog signal and audibly outputs the audio signal.

In the example illustrated in FIG. 39, at least two control units connected via the communication network 7010 may be integrated as one control unit. Alternatively, each control unit may be configured of a plurality of control units. Further, the vehicle control system 7000 may include other control units (not illustrated). Further, in the above description, the other control unit may have some or all of functions of any of the control units. That is, predetermined arithmetic processing may be performed by any of the control units as long as information is transmitted and received via the communication network 7010. Similarly, a sensor or device connected to any of the control units may be connected to the other control unit, and the plurality of control units may transmit and receive detection information to and from each other via the communication network 7010.

A computer program for realizing each function of the imaging device 1 according to the present embodiment described with reference to FIG. 2 (or the imaging device 1A according to the present embodiment described with reference to FIG. 23) can be mounted in any of the control units or the like. Further, it is also possible to provide a computer-readable recording medium in which such a computer program has been stored. The recording medium is, for example, a magnetic disk, an optical disc, a magneto-optical disc, or a flash memory. Further, the above computer program may be distributed via, for example, a network without using the recording medium.

In the vehicle control system 7000 described above, the imaging device 1 according to the present embodiment described with reference to FIG. 2 can be applied to the integrated control unit 7600 of the application example illustrated in FIG. 39. For example, the control unit 53, the signal processing unit 52, the memory 54, and the storage unit 58 of the imaging device 1 correspond to the microcomputer 7610 and the storage unit 7690 of the integrated control unit 7600. For example, when a video outside the vehicle is monitored, the modified display image obtained by the microcomputer 7610 performing modification processing on the captured image data acquired from the imaging unit 7410 via the vehicle-mounted network I/F 7680 is caused to be visually recognized, making it possible to reduce the image display delay due to the display delay time. Accordingly, it is possible to prevent a situation outside the vehicle from being erroneously recognized due to a delay in an image display, and to improve the safety.

Further, at least some of components of the imaging device 1 described with reference to FIG. 2 may be realized in a module for the integrated control unit 7600 illustrated in FIG. 39 (for example, an integrated circuit module configured of one die). Alternatively, the imaging device 1 described with reference to FIG. 2 may be realized by the plurality of control units of the vehicle control system 7000 illustrated in FIG. 39.

11. The Present Technology

The present technology can also adopt the following configurations.

(1)

An imaging device including:
an imaging element;
a delay time acquisition unit configured to acquire a display delay time of a captured image based on an exposure time of an imaging element and a development processing time required for development processing; and
an image data generation unit configured to generate modified display image data in which an image display delay due to the display delay time has been reduced using an amount of change in a position or posture of an imaging device body during the display delay time.

(2)

The imaging device according to (1), including a display unit on which the modified display image data is displayed.

(3)

The imaging device according to (2), wherein the display unit is provided inside an electronic viewfinder.

(4)

The imaging device according to any one of (1) to (3), wherein the image data generation unit performs modification processing for generating the modified display image data so that a display position of a subject on the display unit is shifted as compared with a case in which the modification processing is not performed.

(5)

The imaging device according to any one of (1) to (4), wherein the image data generation unit generates non-modified display image data in which the image display delay due to the display delay time is not reduced, and display image data transmitted to a display unit outside the imaging device is the non-modified display image data.

(6)

The imaging device according to any one of (1) to (5), wherein the image data generation unit generates non-modified display image data in which the image display delay due to the display delay time is not reduced, and the imaging device includes a display image data selection unit configured to select either the modified display image data or the non-modified display image data as display image data to be displayed on a display unit according to a shooting state.

(7)

The imaging device according to (6), wherein the display image data selection unit selects the non-modified display image data when a mode for shooting a moving image is selected as the shooting state.

(8)

The imaging device according to (6) or (7), wherein the display image data selection unit selects the modified display image data when a mode for capturing a still image is selected as the shooting state.

(9)

The imaging device according to any one of (1) to (8), wherein the image data generation unit performs generation of the modified display image data on the basis of information on an incidence optical system for the imaging element.

(10)

The imaging device according to any one of (1) to (9), wherein the image data generation unit uses pixel data having specific brightness for an area of the modified display image data not imaged by the imaging element.

(11)

The imaging device according to any one of (1) to (10), wherein the image data generation unit uses captured image data outside a cropping range for the modified display image data.

(12)

The imaging device according to any one of (1) to (11), including a second imaging element configured to generate second captured image data based on incident light incident through a second incidence optical system, wherein the image data generation unit uses the second captured image data for an area of the modified display image data not imaged by the imaging element.

(13)

The imaging device according to any one of (1) to (9), wherein the image data generation unit uses captured image data in a cropping range for an area of the modified display image data not imaged by the imaging element.

(14)

The imaging device according to (4), wherein the image data generation unit determines a superimposition position according to an amount of shift of the subject with respect to at least a part of a superimposition display image to be superimposed and displayed on captured image data.

(15)

The imaging device according to (14), wherein the image data generation unit determines a superimposition position according to an amount of shift with respect to a focus aiming imaging serving as a superimposed display image.

(16)

The imaging device according to any one of (1) to (15), wherein an area in which the captured image is displayed on a display area of the display unit is smaller than the display area.

(17)

The imaging device according to (16), wherein the image data generation unit performs generation of display image data on which a guide frame indicating an image output area has been superimposed.

(18)

An imaging signal processing device including:
a delay time acquisition unit configured to acquire a display delay time of a captured image based on an exposure time of an imaging element included in an imaging device and a development processing time required for development processing; and
an image data generation unit configured to generate modified display image data in which an image display delay due to the display delay time has been reduced using an amount of change in a position or posture of the imaging device during the display delay time.

(19)

An imaging signal processing method including:
acquiring a display delay time of a captured image based on an exposure time of an imaging element included in an imaging device and a development processing time required for development processing; and
generating modified display image data in which an image display delay due to the display delay time has been reduced using an amount of change in a position or posture of the imaging device during the display delay time.

REFERENCE SIGNS LIST

1 Imaging device
1A Imaging device
4 EVF
5 Rear monitor
7 EVF monitor
50 Optical system
50A Sub-optical system
51a Imaging element
51Aa Sub-imaging element
52 Signal processing unit
53 Control unit

The invention claimed is:

1. An imaging device, comprising:
a first imaging element;
a central processing unit (CPU) configured to:
acquire a display delay time of a captured image based on an exposure time of the first imaging element and a development processing time required for development processing; and
generate modified display image data in which an image display delay due to the display delay time is reduced based on an amount of change in a position or posture of the imaging device during the display delay time.

2. The imaging device according to claim 1, further comprising a display unit configured to display the modified display image data.

3. The imaging device according to claim 2, wherein the display unit is inside an electronic viewfinder.

4. The imaging device according to claim 2, wherein the CPU is further configured to perform modification processing to generate the modified display image data so that a display position of a subject on the display unit is shifted as compared with a case in which the modification processing is not performed.

5. The imaging device according to claim 4, wherein the CPU is further configured to determine a superimposition position based on an amount of shift of the subject with respect to at least a part of a superimposition display image to be superimposed and displayed on captured image data.

6. The imaging device according to claim 5, wherein the CPU is further configured to determine a superimposition position based on an amount of shift with respect to a focus aiming imaging that serves as a superimposed display image.

7. The imaging device according to claim 1, wherein
the CPU is further configured to generate non-modified display image data in which the image display delay due to the display delay time is not reduced, and
the non-modified display image data corresponds to display image data transmitted to a display unit outside the imaging device.

8. The imaging device according to claim 1, wherein the CPU is further configured to:
generate non-modified display image data in which the image display delay due to the display delay time is not reduced, and
select, based on a shooting state, the modified display image data or the non-modified display image data as display image data to be displayed on a display unit.

9. The imaging device according to claim 8, wherein the CPU is further configured to select the non-modified display image data when a mode for shooting a moving image is selected as the shooting state.

10. The imaging device according to claim 8, wherein the CPU is further configured to select the modified display image data when a mode for capturing a still image is selected as the shooting state.

11. The imaging device according to claim 1, wherein the CPU is further configured to perform generation of the modified display image data based on an incidence optical system for the first imaging element.

12. The imaging device according to claim 1, wherein the CPU is further configured to use pixel data having specific brightness for an area of the modified display image data not imaged by the first imaging element.

13. The imaging device according to claim 1, wherein the CPU is further configured to use captured image data outside a cropping range for the modified display image data.

14. The imaging device according to claim 1, comprising:
a second imaging element configured to generate second captured image data based on incident light incident through a second incidence optical system, wherein
the CPU is further configured to use the second captured image data for an area of the modified display image data not imaged by the first imaging element.

15. The imaging device according to claim 1, wherein the CPU is further configured to use captured image data in a cropping range for an area of the modified display image data not imaged by the first imaging element.

16. The imaging device according to claim 1, wherein an area in which the captured image is displayed on a display area of a display unit is smaller than the display area.

17. The imaging device according to claim 16, wherein the CPU is further configured to perform generation of display image data on which a guide frame indicating an image output area is superimposed.

18. An imaging signal processing device, comprising:
a central processing unit (CPU) configured to:
acquire a display delay time of a captured image based on an exposure time of an imaging element included in an imaging device and a development processing time required for development processing; and generate modified display image data in which an image display delay due to the display delay time is reduced based on an amount of change in a position or posture of the imaging device during the display delay time.

19. An imaging signal processing method, comprising:
acquiring a display delay time of a captured image based on an exposure time of an imaging element included in an imaging device and a development processing time required for development processing; and
generating modified display image data in which an image display delay due to the display delay time is reduced based on an amount of change in a position or posture of the imaging device during the display delay time.

* * * * *